US010775558B2

(12) United States Patent
Bookbinder et al.

(10) Patent No.: US 10,775,558 B2
(45) Date of Patent: Sep. 15, 2020

(54) LOW LOSS WIDE BANDWIDTH OPTICAL FIBER

(71) Applicant: Corning Incorporated, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/260,515

(22) Filed: Jan. 29, 2019

(65) Prior Publication Data

US 2019/0243063 A1  Aug. 8, 2019

Related U.S. Application Data

(60) Provisional application No. 62/626,393, filed on Feb. 5, 2018.

(51) Int. Cl.
*G02B 6/28* (2006.01)
*G02B 6/028* (2006.01)
(Continued)

(52) U.S. Cl.
CPC .......... *G02B 6/0281* (2013.01); *G02B 6/0365* (2013.01); *G02B 6/03627* (2013.01); *G02B 6/02266* (2013.01)

(58) Field of Classification Search
CPC ........ G02B 6/28; G02B 6/125; G02B 6/2813; G02B 6/2804; G02B 6/2817
See application file for complete search history.

(56) References Cited

U.S. PATENT DOCUMENTS 5,079,433 A    1/1992   Smith
5,410,567 A    4/1995   Brundage et al.
(Continued)

OTHER PUBLICATIONS

International Search Report and Written Opinion PCT/US2019/016185 dated Apr. 25, 2019, 12 Pgs.

*Primary Examiner* — Jennifer Doan
(74) *Attorney, Agent, or Firm* — Smit Kapadia

(57) ABSTRACT

A single mode optical fiber includes:
(i) a silica based core having a refractive index profile with an alpha ($\alpha$) between 1.8 and 200, a relative refractive index $\Delta_{1max}$ %, and an outer radius $r_1$, wherein 7 microns > $r_1 \geq$ 4.5 microns, the core further comprising silica doped with chlorine, wherein the maximum chlorine concentration in the core is greater than 0.5 wt %; and wherein $1.40 < X < 1.7$ where $X = [(2\pi n_1(2\Delta_{1max} \% \ r_1^2)^{1/2}/V_c) + (0.0028 * V_m)]$, $n_1$ is maximum refractive index of the core, $V_m$ is moat volume, and $V_c$ is a function of core alpha ($\alpha$) and
(ii) an outer cladding region surrounding the first cladding region, the outer cladding region having a relative refractive index $\Delta_4$% such that $\Delta_{1max} > \Delta_4$%.

28 Claims, 4 Drawing Sheets

(51) Int. Cl.
  *G02B 6/036* (2006.01)
  *G02B 6/02* (2006.01)

(56) References Cited

U.S. PATENT DOCUMENTS

| | | |
|---|---|---|
| 6,027,062 A | 2/2000 | Bacon et al. |
| 6,917,740 B2 | 7/2005 | Boek et al. |
| 7,536,076 B2 * | 5/2009 | Khrapko ........... C03B 37/01446 385/141 |
| 7,565,820 B2 | 7/2009 | Foster et al. |
| 7,832,675 B2 | 11/2010 | Bumgarner et al. |
| 8,428,411 B2 | 4/2013 | de Montmorillon et al. |
| 8,428,415 B2 * | 4/2013 | Chen ................... G02B 6/0365 385/128 |
| 9,618,692 B2 | 4/2017 | Berkey et al. |
| 9,802,858 B2 | 10/2017 | Bookbinder et al. |
| 10,094,975 B2 | 10/2018 | Bookbinder et al. |
| 2017/0168231 A1 | 6/2017 | Berkey et al. |
| 2018/0002221 A1 | 1/2018 | Bookbinder et al. |

\* cited by examiner

LOW LOSS WIDE BANDWIDTH OPTICAL FIBER

CROSS-REFERENCE TO RELATED APPLICATIONS

This application claims the benefit of priority to U.S. Provisional Application Ser. No. 62/626,393 filed on Feb. 5, 2018, the content of which is relied upon and incorporated herein by reference in its entirety.

BACKGROUND

The disclosure generally relates to low attenuation optical fibers suitable for dense wavelength division multiplexing (DWDM).

Low attenuation is an important characteristic of standard single mode optical transmission fibers configured to efficiently transmit data over long distances. To increase the information capacity, multiple wavelength transmission technology using dense wavelength division multiplexing (DWDM) is being used with these fibers.

Optical fibers for long haul DWDM applications are currently operated in the C band (1530 nm to 1565 nm) and L band (1565 nm to 1625 nm). The standard single mode transmission optical fiber utilized in these applications has a cable cutoff wavelength below 1260 nm and is optimized for transmission in both the 1310 nm and the 1550 nm wavelength windows. These fibers are also used in L band applications, although they suffer from relatively high bend losses in the 1625 nm wavelength range. For long wavelength bands above the L band, the bending performance of these fibers is further compromised due to very large macro and micro bend induced losses. Thus, typical optical transmission fibers designed to operate within C and L bands have not been utilized in the 1625 nm to 1675 nm wavelength range because they suffer from very high bend induced losses within this wavelength range.

SUMMARY

There is a need for optical fiber designs that can operate at longer wavelengths (beyond L band) with low bending loss, in order to further increase the bandwidth capacity of the fiber and to provide more usable signal channels. For example, the fiber embodiments described herein can advantageously operate with low bend losses at 1625 nm to 1675 nm wavelengths, and/or even at a longer wavelength range (1675 nm to 1725 nm), to provide additional DMDW channels.

According to one embodiment, a single mode optical fiber comprises:
(i) a silica based core comprising a refractive index profile with an alpha (a) between 1.8 and 200, a relative refractive index $\Delta_{1max}$ % with respect to silica, and an outer radius $r_1$, wherein 7 microns>$r_1$≥4.5 microns, the core further comprising silica doped with chlorine, wherein the maximum chlorine concentration in the core is greater than 0.5 wt %; and
(ii)) a cladding comprising an outer cladding region surrounding the core, the outer cladding region having a relative refractive index $\Delta_4$ % with respect to silica, and
wherein the core is structured such that $1.40<X<1.7$ where $X=[(2\pi n_1(2\Delta_{cmax}\%r_1^2)^{1/2}/V_c)+(0.0028V_m)]$, and where
$n_1$ is the maximum refractive index of the core,
$\Delta_{cmax}=(\Delta_{1max}\%-\Delta_4\%)/100\%$,
$V_m$ is the moat volume (for optical fibers without a moat region in the cladding,
$V_m=0$), and $V_c$ is a function of core alpha (a) such that $V_c = -0.0383\alpha^3 + 0.4624\alpha^2 - 1.924\alpha + 5.9152$, for $1 \le \alpha < 5$;
$V_c = 2.123 - 0.0474\alpha$     for $5 \le \alpha < 10$),
$V_c = 2.771 - 0.0122\alpha$,     for $10 \le \alpha < 20$,
$V_c = 2.5575 - 0.0015\alpha$,     for $20 \le \alpha < 100$,
$V_c = 2.5575 - 0.0005\alpha$,     for $100 \le \alpha$;

and
said fiber having mode field diameter (MFD) at 1550 nm wavelength of 10 to 12 microns, a zero dispersion wavelength of less than 1400 nm, a 22 m cable cutoff wavelength of greater than 1275 nm and less than 1530 nm; and
a bend loss of:
(a) less than 0.001 dB/turn at 1550 nm wavelength when the optical fiber is bent around a 30 mm diameter mandrel;
(b) less than 0.1 dB/turn at 1550 nm wavelength when the fiber is bent around a 20 mm diameter mandrel.

According to some embodiments 1.41<X<1.71. According to some embodiments 1.41<X<1.7. According to some embodiments 1.42<X<1.71. According to some embodiments 1.42<X<1.7. According to some embodiments 1.43<X<1.71. According to some embodiments 1.43<X<1.7. According to some embodiments 1.44<X<1.7. According to some embodiments 1.45<X<1.71. According to some embodiments 1.45<X<1.7.

According to some embodiments the maximum chlorine concentration in the core is greater than 1 wt %, for example greater than 1.5 wt %, greater than 2 wt %, or greater than 3 wt %. According to some embodiments the maximum chlorine concentration in the core is between 0.5 wt % and 5 wt %. According to some embodiments the maximum chlorine concentration in the core is between 0.5 wt % and 5 wt % and the cladding comprises silica doped with fluorine. According to some embodiments the maximum chlorine concentration in the core is between 0.5 wt % and 5 wt % and the maximum concentration of $GeO_2$ in the core is less than 0.1 wt %.

According to some embodiments the maximum chlorine concentration in the core is between 0.5 wt % and 5 wt %. According to some embodiments the core is germania free. According to some embodiments the core is alkali free. According to some embodiments the optical fiber is germania free.

According to some embodiments the zero dispersion wavelength is less than 1350 nm, and in some embodiments it is less than 1340 nm. According to some embodiments the zero dispersion wavelength is less than 1330 nm. According to some embodiments the zero dispersion wavelength is between 1280 nm and 1350 nm. According to some embodiments the zero dispersion wavelength is between 1280 nm and 1340 nm. According to some embodiments the zero dispersion wavelength is between 1280 nm and 1330 nm. According to some embodiments the zero dispersion wavelength is between 1285 nm and 1325 nm.

According to some embodiments the 22 m cable cut off wavelength is between 1380 nm and 1540 nm. According to some embodiments the 22 m cable cut off wavelength is between 1390 nm and 1530 nm.

According to some embodiments $0\% \le \Delta_{1max}\% \le 0.5\%$.

According to some embodiments 6.8 microns>$r_1$≥4.7 microns. According to some embodiments 6.7 microns>$r_1$≥4.8 microns. According to some embodiments 6.7 microns>$r_1$>4.7 microns.

According to some embodiments the cladding comprises a moat surrounding the core, the moat having a relative refractive index $\Delta_{3min}$ %.

In some embodiments the moat has an outer radius $r_3$, and 4.5 microns≤$r_3$≤25 microns. In some embodiments 5 microns≤$r_3$<23 microns. In some embodiments 5 microns≤$r_3$≤20 microns.

According to some embodiments the cladding comprises a first cladding region and an outer cladding region, the outer cladding region surrounds the first cladding region, the first cladding region is in contact with and surrounds the core, the first cladding region has a relative refractive index $\Delta_2$ %, an inner radius $r_1$, and an outer radius $r_2$, wherein $r_2$<20 microns and $\Delta_2$ %<$\Delta_{1max}$ %; the cladding further comprises a moat surrounding the first cladding region and situated between the first cladding region and the outer cladding region, the moat having a relative refractive index $\Delta_{3min}$ %, an inner radius $r_2$, and an outer radius $r_3$, wherein $r_3$<25 microns. In some embodiments $r_2$≤15 microns. In some embodiments $r_2$≤11 microns. In some embodiments 4.5 microns≤$r_2$≤11 microns.

In some embodiments, 9 microns≤$r_3$≤25 microns. In some embodiments, 11 microns≤$r_3$≤25 microns. In some embodiments, 10 microns≤$r_3$<25 microns. In some embodiments, 10 microns≤$r_3$≤23 microns. In some embodiments, 9 microns≤$r_3$<20 microns. In some embodiments 10 microns<$r_3$≤20 microns. In some embodiments, 11 microns≤$r_3$≤20 microns.

According to some embodiments the bend loss is less than 0.001 dB/turn at 1550 nm wavelength, when the fiber is bent around a 20 mm diameter mandrel and not greater than 0.0005 dB/turn at 1550 nm wavelength, when the fiber is bent around a 30 mm diameter mandrel. According to some embodiments the bend loss is less than 0.2 dB/turn at 1700 nm wavelength, when the fiber is bent around a 20 mm diameter mandrel and not greater than 0.1 dB/turn at 1700 nm wavelength, when the fiber is bent around a 30 mm diameter mandrel.

According to some embodiments the bend loss is less than 0.1 dB/turn at 1650 nm wavelength, when the fiber is bent around a 20 mm diameter mandrel, and according to some embodiments not greater than 0.003 dB/turn at 1650 nm wavelength, when the fiber is bent around a 30 mm diameter mandrel.

According to some embodiments the bend loss is less than 0.1 dB/turn at 1700 nm wavelength, when the fiber is bent around a 20 mm diameter mandrel, and not greater than 0.005 dB/turn at 1700 nm wavelength, when the fiber is bent around a 30 mm diameter mandrel. According to some embodiments the bend loss is less than 0.1 dB/turn at 1700 nm wavelength, when the fiber is bent around a 20 mm diameter mandrel and not greater than 0.0005 dB/turn at 1700 nm wavelength, when the fiber is bent around a 30 mm diameter mandrel.

According to some embodiments 10.7 microns>MFD (at 1550 nm)>9.2 microns. According to some embodiments 10.6 microns>MFD (at 1550 nm)>9.2 microns. According to some embodiments 10.7 microns>MFD (at 1550 nm)>9.3 microns. According to some embodiments 10.7 microns>MFD (at 1550 nm)>9.4 microns. According to some embodiments 10.7 microns>MFD (at 1550 nm)>9.5 microns. According to some embodiments 10.7 microns>MFD (at 1550 nm)>9.6 microns. According to some embodiments 10.6 microns>MFD (at 1550 nm)>9.7 microns.

According to some embodiments the fiber cladding includes a moat, and 0.1%≥$\Delta_4$ %−$\Delta_{3min}$ %≥0.45%.

According to some embodiments the fiber cladding includes a first cladding region with a relative refractive index $\Delta_2$ %, and the outer cladding region that surrounds, and is in direct contact with, the first cladding region. In at least some of these embodiments $\Delta_{1max}$ %−$\Delta_2$ %>0.3%, and 0%≤$\Delta_{1max}$ %≤0.5%. In some of these embodiments $\Delta_{1max}$ %>0.35%, and 0%≤$\Delta_{1max}$ %≤0.5%.

According to some embodiments the fiber cladding includes a first cladding region, a moat surrounding the first cladding region, and an outer cladding region that surrounds the moat. According to some of these embodiments 0.1%≤($\Delta_4$ %−$\Delta_{3min}$ %)≤0.45% and 0.3%≤($\Delta_2$ %−$\Delta_{3min}$ %)≤0.45%.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawing(s) illustrate one or more embodiments, and together with the description serve to explain principles and operation of the various embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
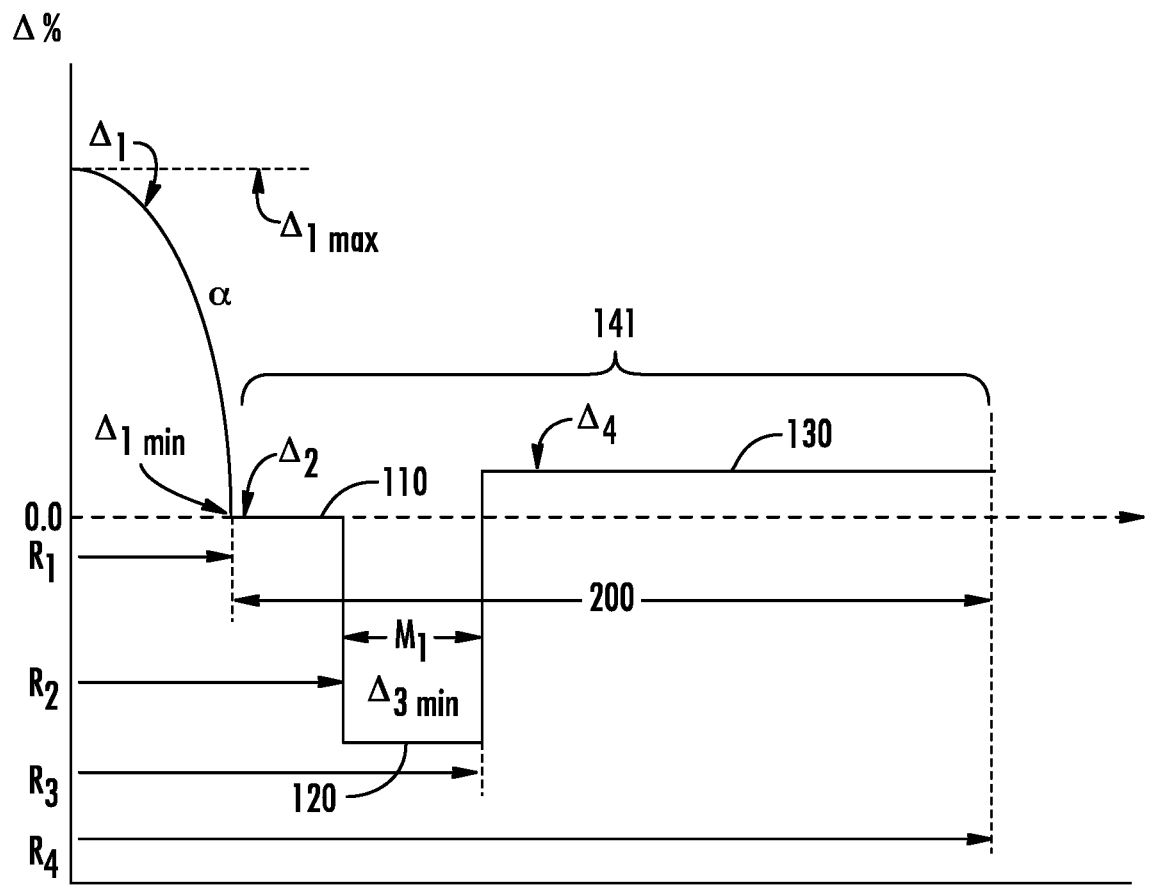
FIG. 1 is a schematic diagram that depicts relative refractive index as a function of fiber radius for one exemplary optical fiber embodiment described herein.

Reference will now be made in detail to the present preferred embodiments, examples of which are illustrated in the accompanying drawings. Whenever possible, the same reference numerals will be used throughout the drawings to refer to the same or like parts.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to denote that two values are equal or approximately equal. In some embodiments, "substantially" may denote values within about 10% of each other. In some embodiments, "substantially" may denote values within about 5% of each other. In some embodiments, "substantially" may denote values within about 1% of each other.

The "refractive index profile" is the relationship between refractive index or relative refractive index and fiber radius.

The terms "µm" and "micron" are used interchangeably herein.

The "relative refractive index percent" (also referred to as the relative refractive index herein) is defined in Equation (1) below as:

$$\Delta\% = 100 \times (n_i^2 - n_s^2)/2n_i^2 \quad (1)$$

where $n_s$ is the refractive index of pure silica and $n_i$ is the average refractive index at point i in the particular region of the optical fiber.

As further used herein, the relative refractive index is represented by $\Delta$ % and its values are given in units of "%", unless otherwise specified. The terms % $\Delta$, $\Delta$ %, percent delta index, % delta and % can be used interchangeably herein. In cases where the refractive index of a region is less than the refractive index of undoped silica, the relative refractive index percent is negative and is referred to as having a depressed region or depressed index relative to silica. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Examples of down-dopants include F and B.

"Chromatic dispersion," herein referred to as "dispersion" unless otherwise noted, of an optical fiber is the sum of the material dispersion and the waveguide dispersion. Zero dispersion wavelength is a wavelength at which the dispersion has a value of zero. Dispersion slope is the rate of change of dispersion with respect to wavelength.

"Effective area" is defined in Equation (2) as follows:

$$A\mathit{eff} = 2\pi \left[ \frac{\left( \int f^2 r dr \right)^2}{\int f^4 r dr} \right] \quad (2)$$

where the integration limits are 0 to ∞, f is the transverse component of the electric field associated with light propagated in the waveguide (i.e., optical fiber), and r is the radius of the fiber. As used herein, "effective area" or "$A_{\mathit{eff}}$" refers to optical effective area at a wavelength of 1550 nm (i.e., the fundamental mode) unless otherwise noted.

The term "alpha" or "α-profile" refers to a relative refractive index profile of the core, which is expressed in terms of $\Delta_1(r)$ %. The core alpha a defines how the relative refractive index profile of the core changes with respect to the radius r. $\Delta_1(r)$ % is in units of "%," where r is radius, and the relationship between the relative refractive index profile of the core and radius r is described by Equation (3) as follows:

$$\Delta_1(r)\% = \Delta_{1,min}\% + (\Delta_{1max}\% - \Delta_{1,min}\%)\left[1 - \left(\frac{r}{r_1}\right)^\alpha\right] \quad (3)$$

where $\Delta_{1max}$ % is the peak (i.e., maximum) relative refractive index percent of the fiber core (relative to pure silica), $\Delta_{1min}$ % is the minimum relative refractive index percent of the fiber core (relative to pure silica) and $r_1$ is the core radius. Alpha as reported herein is measured at 1550 nm. An α=1 corresponds to a triangular relative refractive index profile, an a of 1.5<α<5 corresponds to a strongly graded index profile, where an α=2 describes a parabolic profile, and α>10 corresponds to a profile approaching a step index (i.e., a "step-like index profile" as used herein) profile.

The mode field diameter (MFD) is measured using the Peterman II method as understood in the field of this disclosure according to Equation (4) as follows:

$$MFD = 2w; \text{ and } w^2 = 2\frac{\int f^2 r dr}{\int \left(\frac{df}{dr}\right)^2 r dr} \quad (4)$$

where w is the mode field radius, and the integral limits are 0 to ∞.

$V_m$ is the moat volume (i.e., the relative refractive index volume of the moat).

$V_m$ is defined by the following relation:

$$V_m = \int_{r_1}^{r_2} |\Delta_{3-4}\%| r dr \quad (5)$$

wherein $\Delta_{3-4}$ % is the difference between the relative refractive index of the moat and the outer cladding region (and since $\Delta(r)$ % is in units of %, $\Delta_{3-4}$ % is also in units of %).

The units for $V_m$ are $\%\Delta\mu m^2$. If the optical fiber embodiment does not include a moat within the cladding, then $V_m = 0\%\Delta\mu m^2$.

The parameter X depends on the size and the shape of the fiber core and is defined as:

$$X = [(2\pi n_1(2\Delta_{cmax}r_1^2)^{1/2}/V_c) + (0.0028 V_m)] \quad (6)$$

where
$n_1$ is the maximum refractive index of the fiber core
$r_1$ is an outer radius of the fiber core,
$\Delta_{cmax}$ is related to the maximum relative refractive index of the fiber core and is defined as $\Delta_{cmax} = (\Delta_{1max}\% - \Delta_4\%)/100\%$,
$\Delta_4$ % is relative refractive index percent of the fiber's outer cladding region,
$V_m$ is the moat volume (if the fiber cladding does not contain the moat, then $V_m = 0$), and
$V_c$ is a function of core alpha (i.e., it is a function of a), as described below.

Calculation of $\Delta_{cmax}$ is illustrated using the following example: In example 17 (EX. 17) of optical fiber embodiment provided below in in Table 1B, the maximum or the peak relative refractive index percent of the fiber core $\Delta_{1max}$ is 0.43%, and $\Delta_4$ % is 0.05%. Using the above equation for $\Delta_{cmax}$, for this case the $\Delta_{cmax}$ is calculated as (0.43%-0.05%)/100%=0.0038. Note that the parameter $\Delta_{cmax}$ is measured as a ratio, and not in %.

Vc is calculated as follows:

| | |
|---|---|
| $V_c = -0.0383\alpha^3 + 0.4624\alpha^2 - 1.924\alpha + 5.9152$ | for $1 \leq \alpha < 5$ |
| $V_c = 2.123 - 0.0474\alpha$ | for $5 \leq \alpha < 10$ |
| $V_c = 2.771 - 0.0122\alpha$ | for $10 \leq \alpha < 20$ |
| $V_c = 2.5575 - 0.0015\alpha$ | for $20 \leq \alpha < 100$, |
| $V_c = 2.5575 - 0.0005\alpha$ | for $\alpha < 200$. |

Below are $V_c$ numbers for several exemplary alpha values:

| Alpha ($\alpha$) | $V_c$ |
|---|---|
| 1 | 4.381 |
| 2 | 3.518 |
| 3 | 3.181 |
| 4 | 3 |
| 5 | 2.886 |
| 10 | 2.649 |
| 20 | 2.527 |
| 100 | 2.405 |

A "cable cutoff measurement," as used herein, is performed using the standard 22 m test described in EIA-455-170 Cable Cutoff Wavelength of Single-mode Fiber by Transmitted Power, or "FOTP-170."

It is preferred that the fibers of this disclosure have an outer cladding diameter of between about 80 microns and about 150 microns. In some aspects, the optical fibers may have an outer cladding diameter of between about 120 microns and about 130 microns. Certain preferred embodiments of the fibers have an outer cladding diameter of about 125 microns. The embodiments of the optical fibers 100 described herein have cores that can have a step index or a graded index profile. The fiber cores of the exemplary embodiments described herein have a refractive index profile with an alpha of 200 or less, for example between 1.8 and 200, or between 1.9 and 100, or between 1.9 and 20. For example, the core alpha of the exemplary graded index core fibers 100 may be 1.95, or 2, or 2.1, or 2.2, or 2.3, or 2.5, or 3, or 4, or 5 or therebetween. A graded refractive index core with an alpha less than 5 helps in reducing the small angle scattering contribution to the optical fiber attenuation.

The exemplary optical fiber embodiments have attenuation levels at 1550 nm of less than about 0.18 dB/km, for example, less than about 0.175 dB/km, less than 0.17 dB/km, or even less than 0.16 dB/km. According to some embodiments the optical fiber may have attenuation from about 0.16 dB/km to 0.18 dB/km at a 1550 nm wavelength.

FIGS. 1-4 depict schematically relative refractive index profiles as a function of fiber radius for several exemplary embodiments of the optical fibers 100, according to aspects of this disclosure. These relative refractive index profiles (in terms of $\Delta$ %) of the exemplary embodiments of the optical fibers 100 are specified and/or plotted relative to pure (undoped) silica (which has the relative refractive index of 0%). These exemplary embodiments of optical fiber 100 are single mode (SM) at 1550 nm.

As shown in FIGS. 1-4, optical fiber 100 possesses a core 101. The relative refractive index $\Delta_1$ % of the core 101 may vary as a function of fiber radius (r), and has a maximum relative refractive index $\Delta_{1max}$ %. The core 101 has an outer core radius $r_1$ which corresponds to minimum relative refractive index $\Delta_{min}$ %.

According to some embodiments, the core 101, from its center to its radius $r_1$ contains $SiO_2$ doped with Cl. In some embodiments additional dopants (e.g., F) may also be utilized. Optionally, the core 101 may be additionally doped with $K_2O$, and or $P_2O_5$. These dopants may be introduced into the $SiO_2$ core 101 by OVD, VAD, MCVD, and PCVD processing methods.

Although the cores 101 of the fibers 100 disclosed herein may optionally contain some level of alkali, the exemplary embodiments disclosed herein may employ cores which are substantially free of alkali. In at least some embodiments the cores have essentially no alkali. In at least some embodiments the cores contain no alkali.

Further, the core 101 of the optical fibers 100 may have a peak relative refractive index delta $\Delta_{1max}$ % of about 0% to about +0.55%, (e.g., 0.3% to 0.5%) relative to pure silica. The difference between peak (maximum) relative refractive index delta of the core, $\Delta_{1max}$ % and the relative refractive index delta of the outer cladding region may range from about from about 0.3% to 0.5%, or from 0.25% to 0.45%. In addition, the core 101 of exemplary embodiments of the optical fibers 100 is preferably configured for single mode operation at 1550 nm, and in such embodiments may have a core radius $r_1$ of about 4.5. to 7.5 microns. The effective area, $A_{eff}$ of core 101 at 1550 nm may range from about 70 $\mu m^2$ to about 90 $\mu m^2$ (for example, between 72 $\mu m^2$ and 87 $\mu m^2$). The effective area, $A_{eff}$ of core 101 at 1650 nm may range from about 75 $\mu m^2$ to about 100 $\mu m^2$ (for example, between 78 $\mu m^2$ and 96 $\mu m^2$). In some embodiments the effective area, Aeff, of the core 101 at 1700 nm may range from about 75 $\mu m2$ to about 100 $\mu m2$ (for example, between 80 $\mu m2$ and 97 $\mu m2$).

Optical fibers 100 have a cladding 141 that includes one or more cladding regions. Cladding 141 has a thickness 200. Optical fibers 100 may also include a protective coating 151 (not shown) situated over the cladding 141. The cladding regions comprise silica, and one or more cladding regions may be down-doped or up-doped relative to silica. In addition, as discussed below, the cladding 141 may include a depressed index region (also referred to herein as a "moat", or a "moat region") having a relative refractive index that is substantially constant and lower than a relative refractive index of the of the outer cladding region (with the outer cladding region having the relative refractive index profile $\Delta_4$ % depicted in FIG. 1).

The cladding regions may primarily contain $SiO_2$ doped with F, with an outer cladding region having a smaller amount of F than the depressed index region. Optionally, Cl and/or $GeO_2$ can be employed as dopants in the various cladding regions in addition to the F dopant. Alternatively, as described above, the outer cladding region may be primarily contain $SiO_2$ (i.e., it can be without F).

In some embodiments the cladding 141 comprises a depressed refractive index region 120 and the outer cladding region 130 surrounds the moat 120. The depressed refractive index region (moat) 120 is a cladding region that has a lower refractive index than the directly adjacent fiber regions. This is shown, for example, in FIGS. 1, 2, 3. In some embodiments, the depressed index cladding region 120 is in direct contact with the core 101 and the fiber does not include first cladding region 110, i.e., $r_1=r_2$. This is shown, for example, in FIGS. 2 and 3. The depressed index cladding region (moat) has a relative refractive index $\Delta_{3min}$ % and an outer radius $r_3$.

In some embodiments (see, for example, FIG. 1) the cladding 141 comprises a first cladding region 110 in contact with and surrounding the core 101, a depressed index cladding region (moat) 120 surrounding the core 101 and situated in contact with the first cladding region 110, and an outer cladding region 130 surrounding both the first cladding region 110 and the depressed index cladding region (moat) 120. The first cladding region 110 has an inner radius $r_1$ and an outer radius $r_2$. The moat 120 has an inner radius $r_2$ and an outer radius $r_3$. The outer cladding region 130 has an inner radius $r_3$ and an outer radius $r_4$. In some embodiments the relative refractive index (corresponding to $\Delta_4$ %) of the outer cladding 130 is preferably substantially constant out to the outer radius $r_4$.

Each of these cladding regions 110, 120, 130 surrounds the core 101. Together, these cladding regions possess a total thickness 200, corresponding to the thickness of the cladding 141. The total thickness 200 of the cladding 141 is $r_4-r_1$.

Figure 2:
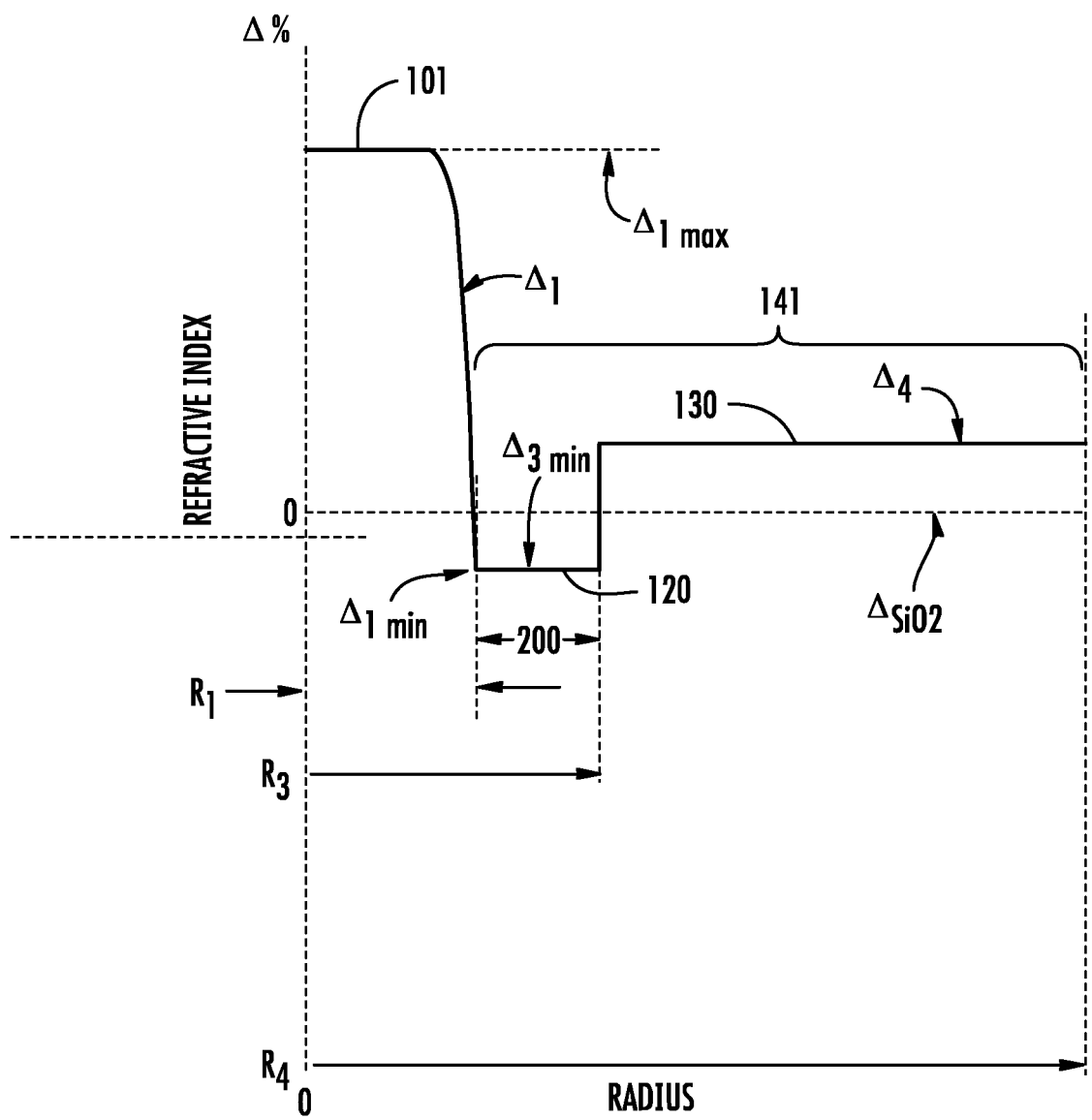
FIG. 2 is a schematic diagram that depicts relative refractive index as a function of fiber radius for another exemplary optical fiber embodiments described herein.
Figure 3:
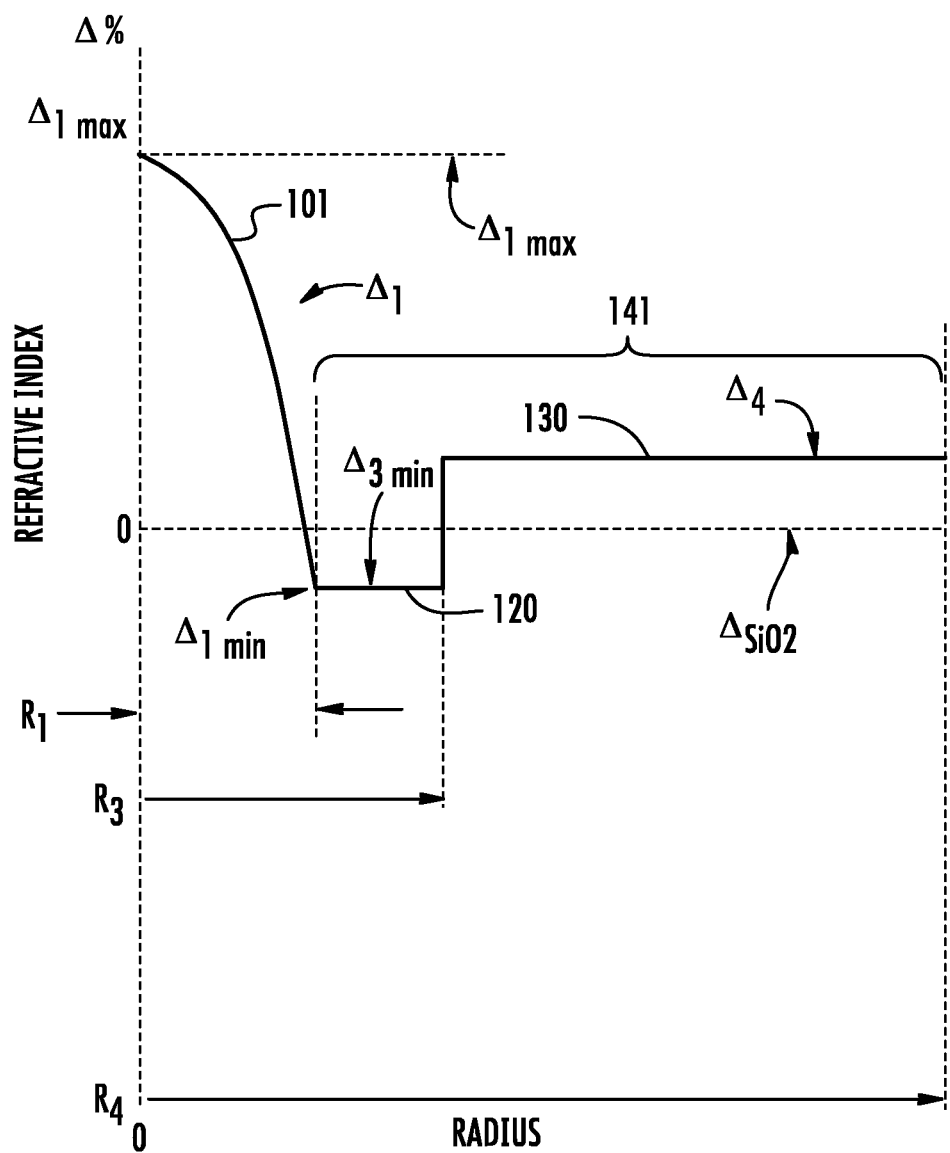
FIG. 3 is a schematic diagram that depicts relative refractive index as a function of fiber radius for another exemplary optical fiber embodiments described herein.
Figure 4:
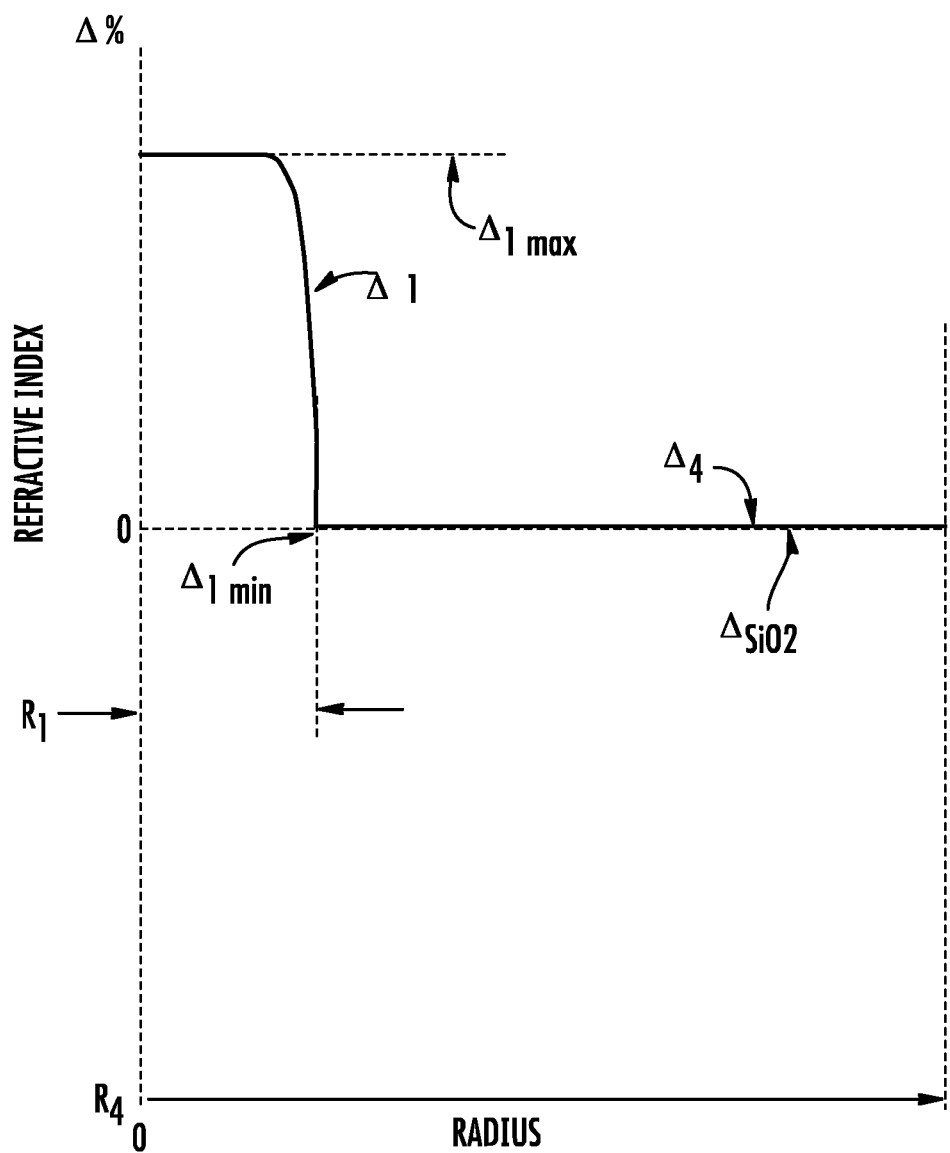
FIG. 4 is a schematic diagram that depicts relative refractive index as a function of fiber radius for yet another exemplary optical fiber embodiments described herein.

As depicted in FIGS. 1-3, the depressed index cladding region (moat) 120 has a relative refractive index with a lower refractive index delta than the relative refractive index profile of the outer cladding region 120. The relative refractive index profiles of cladding regions 120, 130 may each possess a step-shaped profile. In FIG. 1-3 embodiments, the relative refractive index of the depressed index cladding region 120 exhibits a moat of width $m_1$ such that $m_1=r_3-r_2$ such that its relative refractive index ($\Delta_3$ %) is lower than the relative refractive index of the core 101 and the relative refractive index ($\Delta_4$ %) of the adjacent outer cladding region 130. In the embodiments of the optical fiber that include the first cladding region 110 situated between the core and the depressed index cladding region 120, the relative refractive index percent ($\Delta_{3min}$ %) of the depressed index cladding region 120 is lower than the relative refractive index ($\Delta_2$ %) of the first cladding region 110 and is also lower than the relative refractive index ($\Delta_4$ %) of the adjacent outer cladding region 130.

As is shown, for example, in FIGS. 2 and 3, if the optical fiber 100 does not include a first cladding region 110 and the core is situated in contact with the moat 120, then $r_2=r_1$ (because the thickness of the cladding region 110 is 0) and $m_1=r_3-r_2=r_3-r_1$). This is shown, for example, in FIGS. 2 and 3. In these embodiments the relative refractive index ($\Delta_3$ %) is lower than the relative refractive index of the core 101 and the relative refractive index ($\Delta_4$ %) of the adjacent outer cladding region 130.

It is noted that Br, and/or F and/or Cl, or combinations thereof, may be included as refractive index altering dopants in the depressed index cladding region 120 to facilitate the creation of the moat of width $m_1$ with respect to outer cladding region 130. The relative refractive index profile of the outer cladding 130 is preferably substantially constant out to its outer radius $r_4$.

The embodiments of the optical fibers 100 and described herein are configured for single mode operation at a wavelength greater than 1530 nm (e.g., 1550 nm 1600 nm, 1650 nm and/or 1700 nm) and can advantageously have excellent performance and uncharacteristically low bend loss over an unusually wide wavelength band. The embodiments of the optical fibers 100 and described herein are also advantageously configured for single mode operation within the 1625 nm 1725 nm wavelength band. The optical fibers 100 may be used to transmit optical signals in both the C and L bands, as well as in the 1625 nm to 1675 nm band with low bend losses. That is, surprisingly and advantageously, optical fibers 100 can be operated simultaneously as C-band fibers (for transmission in 1530 to 1565 nm wavelength band), as L band fibers (for transmission in 1565 to1625 nm wavelength band) and in the additional 100 nm wide wavelength range (1625 nm to 1725 nm), while simultaneously operating with low bend losses across in each of these wavelength bands (C, L, and the 1625 nm to 1725 nm wavelength bands).

As used herein, "bend loss" refers to a macrobend loss value for the optical fibers, as measured at the specified wavelength, in units of dB/turn. Exemplary values for the bend losses for different exemplary fiber 100 embodiments are provided in Tables 1A and 1B at different wavelengths.

According to some embodiments the bend loss is less than 0.1 dB/turn at 1550 nm wavelength when the fiber is bent around a 20 mm diameter mandrel; and less than 0.001 dB/turn at 1550 nm wavelength when the optical fiber is bent around a 30 mm diameter mandrel. According to some embodiments the bend loss is less than 0.05 dB/turn at 1550 nm, when the fiber is bent around a 20 mm diameter mandrel, and not greater than 0.001 dB/turn at 1550 nm, when the fiber is bent around a 30 mm diameter mandrel. According to some embodiments the bend loss between $10^{-4}$ dB/turn and 0.05 dB/turn at 1550 nm, when the fiber is bent around a 20 mm diameter mandrel, and between $10^{-4}$ dB/turn and 0.001 dB/turn at 1550 nm, when the fiber is bent around a 30 mm diameter mandrel. According to some embodiments the bend loss is less than 0.07 dB/turn at 1550 nm, when the fiber is bent around a 20 mm diameter mandrel, and not greater than 0.0007 dB/turn at 1550 nm, when the fiber is bent around a 30 mm diameter mandrel. According to some embodiments the bend loss is less than 0.05 dB/turn at 1550 nm, when the fiber is bent around a 20 mm diameter mandrel, and not greater than 0.0005 dB/turn at 1550 nm, when the fiber is bent around a 30 mm diameter mandrel.

According to some embodiments the bend loss is less than 0.07 dB/turn at 1600 nm, when the fiber is bent around a 20 mm diameter mandrel, and not greater than 0.001 dB/turn at 1600 nm, when the fiber is bent around a 30 mm diameter mandrel. For example, according to some embodiments the bend loss is less than 0.05 dB/turn at 1600 nm, when the fiber is bent around a 20 mm diameter mandrel, and not greater than 0.001 dB/turn at 1600 nm, when the fiber is bent around a 30 mm diameter mandrel. According to some embodiments the bend loss between $10^{-4}$ dB/turn and 0.05 dB/turn at 1600 nm, when the fiber is bent around a 20 mm diameter mandrel, and between $10^{-4}$ dB/turn and 0.001 dB/turn at 1600 nm, when the fiber is bent around a 30 mm diameter mandrel. According to some embodiments the bend loss is less than 0.005 dB/turn at 1600 nm wavelength when the fiber is bent around a 20 mm diameter mandrel; and less than 0.001 dB/turn at 1600 nm wavelength when the optical fiber is bent around a 30 mm diameter mandrel. According to some embodiments the bend loss is less than 0.007 dB/turn at 1600 nm, when the fiber is bent around a 20 mm diameter mandrel, and not greater than 0.0007 dB/turn, when the fiber is bent around a 30 mm diameter mandrel. According to some embodiments the bend loss is less than 0.05 dB/turn at 1600 nm, when the fiber is bent around a 20 mm diameter mandrel. According to some embodiments the bend loss is not greater than 0.0005 dB/turn at 1600 nm, when the fiber is bent around a 30 mm diameter mandrel.

According to some embodiments the bend loss is less than 0.1 dB/turn at 1650 nm, when the fiber is bent around a 20 mm diameter mandrel and not greater than 0.001 dB/turn, when the fiber is bent around a 30 mm diameter mandrel. According to some embodiments the bend loss between $10^4$ dB/turn and 0.1 dB/turn at 1650 nm, when the fiber is bent around a 20 mm diameter mandrel, and between $10^4$ dB/turn and 0.001 dB/turn at 1650 nm, when the fiber is bent around a 30 mm diameter mandrel. According to some embodiments the bend loss is less than 0.08 dB/turn at 1650 nm, when the fiber is bent around a 20 mm diameter mandrel and not greater than 0.0008 dB/turn, when the fiber is bent around a 30 mm diameter mandrel. According to some embodiments the bend loss is less than 0.05 dB/turn at 1650 nm, when the fiber is bent around a 20 mm diameter mandrel and not greater than 0.001 dB/turn, when the fiber is bent around a 30 mm diameter mandrel.

According to some embodiments the bend loss is less than 0.5 dB/turn at 1700 nm wavelength when the fiber is bent around a 20 mm diameter mandrel; and not greater than 0.006 dB/turn at 1700 nm wavelength when the optical fiber is bent around a 30 mm diameter mandrel. According to some embodiments the bend loss is less than 0.25 dB/turn at 1700 nm wavelength when the fiber is bent around a 20 mm diameter mandrel; and not greater than 0.006 dB/turn at 1700 nm wavelength when the optical fiber is bent around a 30 mm diameter mandrel. According to some embodiments the bend loss is between $10^4$ dB/turn and 0.5 dB/turn at 1700 nm, when the fiber is bent around a 20 mm diameter mandrel, and between $10^4$ dB/turn and 0.005 dB/turn at 1700 nm, when the fiber is bent around a 30 mm diameter mandrel. According to some embodiments the bend loss is not greater than 0.225 dB/turn at 1700 nm when the fiber is bent around a 20 mm diameter mandrel, and not greater than 0.005 dB/turn, when the fiber is bent around a 30 mm diameter mandrel. According to some embodiments the bend loss is less than 0.2 dB/turn at 1700 nm, when the fiber is bent around a 20 mm diameter mandrel and not greater than 0.004 dB/turn, when the fiber is bent around a 30 mm diameter mandrel. According to some embodiments the bend loss is less than 0.15 dB/turn at 1700 nm, when the fiber is bent around a 20 mm diameter mandrel and not greater than 0.004 dB/turn, when the fiber is bent around a 30 mm diameter mandrel. According to some embodiments the bend loss is less than 0.1 dB/turn at 1700 nm, when the fiber is bent around a 20 mm diameter mandrel and is not greater than 0.003 dB/turn, when the fiber is bent around a 30 mm diameter mandrel.

EXAMPLES

Various embodiments of the foregoing fibers will be further clarified by the following examples of modeled fibers. It will be apparent to those skilled in the art that various modifications and variations can be made without departing from the spirit or scope of the present disclosure. All of the examples listed below have an outer cladding radius of 62.5 microns, and a fiber cladding diameter of 125 microns. Further, all optical parameters provided for the fibers modeled below are at 1550 nm and the LP01 mode, unless otherwise stated.

Examples of modeled properties are shown below in Tables 1A and 1B, consistent with one or more of the optical fibers 100 described in the foregoing aspects of the disclosure. More specifically, set forth in Tables 1A and 1B below are the following parameters and fiber dimensions for five embodiments of exemplary single mode fibers: $\Delta_{1max}$ (%) of the core 101, core alpha, outer radius $r_1$ of the core 101, the outer radius of the first cladding region ($r_2$, μm), $\Delta_2$ (%) (i.e., the relative refractive index of the first cladding region 110 (also referred to herein as the "inner cladding"), the outer radius $r_3$ (μm) of the moat, 130, minimum relative refractive index percent of the moat $\Delta_{3min}$ %, relative refractive index percent of outer cladding region $\Delta_4$ (%), the cladding outer radius $r_4$ (μm), 22 meter cable cutoff wavelength (nm), mode field diameter MFD (μm), effective area, Aeff (μm$^2$) at 1550 nm, 1600 nm, 1650 nm, and 1700 nm wavelengths, dispersion (ps/nm/km) and dispersion slope (ps/nm$^2$/km) at 1550 nm, 1600 nm, 1650 nm, and 1700 nm wavelengths, and zero dispersion wavelength (Lambda zero, nm). Also included in Tables 1A and 1B are bend loss values at 1550 nm in dB/turn for 20 mm and 30 mm diameter mandrels at the 1550 nm, 1600 nm, 1650 nm, and 1700 nm wavelengths.

The moat volume $V_m$ of the exemplary embodiments shown in Tables 1A and 1B are between 0% Δmicron$^2$ and 70%Δ micron$^2$, and in some embodiments or between 0%Δ micron$^2$ and 50% Δ micron$^2$. If the fiber cladding 141 does not include a moat, $V_m$=0% micron$^2$. The moat volume $V_m$ of the exemplary embodiments disclosed in Table 1A and 1B are between 5% Δ micron$^2$ and 60% Δ micron$^2$, and in at least some embodiments between 5% Δ micron$^2$ and 50% Δ micron$^2$. Larger values of $V_m$ are obtained when the moat-contains more down dopants, e.g., fluorine or boron.

Fiber embodiments of examples 1-6 (Ex. 1-Ex. 6 fibers of Table 1A) include a core 101 and an outer cladding region 130 directly adjacent to the core. That is, these fiber embodiments do not include either the first cladding region (inner cladding) 110 or the depressed index cladding region (i.e. moat) 120. Accordingly, for these embodiments, $r_1=r_2=r_3$ (because the first cladding region 110 and depressed index cladding region 120 have zero thickness). In these embodiments moat volume $V_3$=0%μm$^2$. These fiber embodiments are similar to that shown in FIG. 4. Fiber embodiments of Ex. 1-4 have cores 101 with α=20 and the cores have relative refractive index profiles similar to that shown by a solid curve in FIG. 4. Fiber embodiments of Ex. 5 and 6 have cores 101 with α=2, and core refractive index profiles that similar to that shown by a dashed curve.

In fibers of examples 7-9 (Ex. 7-Ex. 9 of Table 1A) the core 101 is in contact with and is surrounded by the depressed index cladding region 120, which is surrounded by the outer cladding region 130. Thus, because the first cladding region 110 has a thickness of zero, for these embodiments $r_1=r_2$). The moat region of Ex. 7 fiber is down-doped with fluorine, and the outer cladding region is made of undoped silica. In Ex. 7 fiber $\Delta_{3min}$ %=−0.1% and $\Delta_4$ %=0%. In fibers of examples 8 and 9 the moat region is made of pure silica (thus $\Delta_{3min}$ %=0%) and the outer cladding region is updoped with chlorine (thus $\Delta_4$ % is also >0%).

Fiber embodiments of examples 10-11 (Ex. 10 and Ex. 11 fibers of Table 1B) include a core 101 and the depressed index cladding region (moat) 120 that surrounds and is in contact with the core 101. The outer cladding region 130 surrounds and is in contact with depressed index cladding region 120. Thus, for these embodiments $r_1=r_2$ (because these fiber embodiments do not include either the first cladding region 110, i.e., the first cladding region 110 has zero thickness). In these embodiments the relative refractive index of the moat 120 is also smaller than that of the outer cladding region—i.e., $\Delta_{3min}$ %<$\Delta_4$ %. More specifically in fibers of examples 10 and 11 the moat region 120 is made of pure silica (thus $\Delta_{3min}$ %=0%) and the outer cladding region 130 is updoped with chlorine (thus $\Delta_4$ %>0%).

Fiber embodiments of examples 12 and 13 (Ex 12 and Ex 13 of Table 1B) are similar to fiber embodiments of examples 10-11. However in these exemplary embodiments the moat region 120 is down-doped with fluorine and therefore 43.%<0%. In fiber example 12 the outer cladding 130 is pure silica, thus $\Delta_4$ %=0%. In fiber example 13 the outer cladding is silica down doped with fluorine, thus $\Delta_4$ %<0%. However in fiber example 13 the outer cladding region 130 contains less fluorine than the depressed index cladding region 120, thus in this fiber embodiment $A_{3min}$ % is still less (more negative) than $\Delta_4$ %.

In the fiber embodiment corresponding to Ex. 14 of Table 1B, the core 101 is a silica based core co-doped with Cl and F. The maximum relative refractive index of the core ($\Delta_{1max}$ %) is zero because the core 101 contains both the updopant (Cl) and the downdopant (F) in the amounts that cancel each other's effect on the refractive index of the core glass. In this embodiment the moat region is fluorine doped silica, and thus $\Delta_{3min}$ % is negative ($\Delta_{3min}$ %=−0.47%). In fiber example 14 the outer cladding is silica down doped with fluorine, thus $\Delta_4$ is also negative ($\Delta_4$=−0.37%). However, in the example 14 fiber the outer cladding region 130 contains less fluorine than the depressed index cladding region 120, thus in this fiber embodiment $\Delta_{3min}$ % is ≤$\Delta_4$ %.

In Ex. 15 fiber, the core 101 is silica updoped with chlorine such that $\Delta_{1max}$ %=0.34%. In this embodiment the core 101 does not contain a down-dopant. The core 101 has an outer radius $r_1$=5.7 microns (μm) and is surrounded by and is in contact with the depressed index cladding region 120 (moat), which is silica down-doped with F. The depressed index cladding region 120 has $\Delta_{3min}$ %=−0.4%. In this exemplary embodiment the moat volume $V_m$ is 21.6% Δ micron. Because this fiber embodiment does not have a first cladding region 110, $r_2=r_1$, and the inner radius of the depressed index cladding region=5.7 μm.

In fibers of examples 16 and 17 (Ex. 16 and 17 of Table 1B), the core 101 is silica updoped with chlorine such that $\Delta_{1max}$ % is positive (0.37% and 0.43%, respectively). In these embodiments the core 101 also does not contain a down-dopant. In these fibers, the core 101 is surrounded by an annular first cladding region 110, which is pure silica ($\Delta_2$ %=0%). In fiber Ex. 16, the first cladding region has an inner radius $r_1$=4.9 microns (μm) and an outer radius $r_2$=10.2 μm. In fiber Ex. 17, the first cladding region has an inner radius $r_1$=5 μm and an outer radius $r_2$=8 μm. In these exemplary fiber embodiments the first cladding region 110 is in contact with and is surrounded by a depressed index cladding region (moat) 120 with $A_{3min}$ %=−0.4%. The depressed index cladding region 120 is in turn surrounded by an outer cladding region 130. Table 1B shows that the depressed index cladding region 120 of these embodiments has a relative refractive index $A_{3min}$ % that is smaller than that of the first cladding region 110 and that of the outer cladding region—i.e. $A_{3min}$ %<$\Delta_2$ %, and $\Delta_{3min}$ %<$\Delta_4$ %.

In the fiber embodiment corresponding to Ex. 18 of Table 1B, the core 101 is a silica based core doped with Cl and F. The maximum relative refractive index of the core ($\Delta_{3max}$) is zero because the core 101 contains both the updopant (cl) and the downdopant (F) in the amounts that cancel each other's effect on the refractive index of the core glass. In this fiber embodiment the core 101 is surrounded by a first cladding region 110, which is down-doped silica ($A_2$%=−0.36%). In fiber Ex. 18, the first cladding region has an inner radius $r_1$=4.9 μm and an outer radius $r_2$=9.5 μm and is down-doped so that $A_2$%=−0.36%. In this exemplary fiber embodiment the first cladding region 110 is in contact with and is surrounded by a depressed index cladding region (moat) 120 with $\Delta_{3min}$ %=−0.7%. The depressed index cladding region 120 is in turn surrounded by an outer cladding region. The outer cladding region has $\Delta_4$=−0.36%. Thus, the depressed index cladding region 120 of this embodiment has a relative refractive index $\Delta_{3min}$ that is smaller than that of the first cladding region 110 and that of the outer cladding region—i.e., $\Delta_{3min}$ %<$\Delta_2$ %, and $\Delta_{3min}$ %<44%. In Ex. 18 embodiment each of the cladding regions 110, 120 and 130 comprise fluorine doped silica, and thus $\Delta_2$%, $\Delta_4$%, and $\Delta_{3min}$ % are all negative, but the depressed index cladding region 120 contains more fluorine than the cladding regions 110 and 130 and therefore $\Delta_{3min}$<$\Delta_2$ %, and $\Delta_{3min}$<$\Delta_4$ %).

TABLE 1A

| Parameter | Ex 1 | Ex 2 | Ex 3 | Ex 4 | Ex 5 | Ex 6 | Ex 7 | Ex 8 | Ex 9 |
|---|---|---|---|---|---|---|---|---|---|
| Core Delta, $\Delta_{1max}$ % | 0.38 | 0.39 | 0.36 | 0.41 | 0.45 | 0.47 | 0.38 | 0.42 | 0.395 |
| Core radius, $r_1$, microns | 5 | 5.1 | 5.2 | 4.8 | 6.4 | 6.3 | 5.3 | 5.4 | 5.3 |
| Core Alpha | 20 | 20 | 20 | 20 | 2 | 2 | 20 | 20 | 20 |
| Maximum Chlorine in Core, wt % | 3.8 | 3.9 | 3.6 | 4.1 | 4.5 | 4.7 | 3.8 | 4.2 | 3.95 |
| Fluorine in Core, wt % | 0 | 0 | 0 | 0 | 0 | 0 | 0 | 0 | 0 |
| Inner Cladding Index, $\Delta_2$ % | 0 | 0 | 0 | 0 | 0 | 0 | 0 | 0 | 0 |

TABLE 1A-continued

| Parameter | Ex 1 | Ex 2 | Ex 3 | Ex 4 | Ex 5 | Ex 6 | Ex 7 | Ex 8 | Ex 9 |
|---|---|---|---|---|---|---|---|---|---|
| Inner Cladding Radius, $r_2$, microns | 5 | 5.1 | 5.2 | 4.8 | 6.4 | 6.3 | 5.3 | 5.4 | 5.3 |
| Moat Index, $\Delta_3\%$ | 0 | 0 | 0 | 0 | 0 | 0 | −0.1 | 0 | 0 |
| Moat-Outer Radius, $r_3$, microns | 5 | 5.1 | 5.2 | 4.8 | 6.4 | 6.3 | 13.6 | 12.7 | 10 |
| Outer Cladding Index, $\Delta_4\%$ | 0 | 0 | 0 | 0 | 0 | 0 | 0 | 0.05 | 0.03 |
| Outer Cladding Radius, $r_4$ | 62.5 | 62.5 | 62.5 | 62.5 | 62.5 | 62.5 | 62.5 | 62.5 | 62.5 |
| Moat Volume, $V_m$, (% $\Delta$ micron$^2$) | 0 | 0 | 0 | 0 | 0 | 0 | 15.68 | 6.60 | 2.16 |
| MFD at 1550 nm, micron | 10.3 | 10.2 | 10.6 | 9.9 | 10.3 | 10.0 | 9.8 | 10.2 | 10.4 |
| Aeff at 1550 nm, micron$^2$ | 83.2 | 83.5 | 88.8 | 76.9 | 79.7 | 76.6 | 77.9 | 84.9 | 86.0 |
| Dispersion at 1550 nm, ps/nm/km | 19.1 | 19.4 | 19.4 | 18.8 | 18.0 | 17.9 | 20.8 | 20.4 | 19.9 |
| Dispersion Slope at 1550 nm, ps/nm$^2$/km | 0.0590 | 0.0594 | 0.0595 | 0.0585 | 0.0612 | 0.0612 | 0.0599 | 0.0598 | 0.0595 |
| Pin array at 1550 nm (dB) | 0.7 | 0.3 | 1.0 | 0.3 | 0.7 | 0.4 | 0.5 | 0.6 | 0.2 |
| Lateral load at 1550 nm (dB/m) | 0.08 | 0.05 | 0.15 | 0.03 | 0.09 | 0.05 | 0.04 | 0.07 | 0.03 |
| MFD at 1600 nm. Micron | 10.5 | 10.5 | 10.8 | 10.1 | 10.5 | 10.3 | 9.9 | 10.4 | 10.6 |
| Aeff at 1600 nm, micron$^2$ | 86.4 | 86.5 | 92.1 | 79.9 | 83.4 | 80.1 | 80.1 | 87.5 | 88.9 |
| Dispersion at 1600 nm, ps/nm/km | 21.9 | 22.3 | 22.3 | 21.6 | 21.0 | 20.9 | 23.7 | 23.3 | 22.7 |
| Dispersion Slope at 1600 nm, ps/nm$^2$/km | 0.0559 | 0.0562 | 0.0563 | 0.0554 | 0.0580 | 0.0579 | 0.0565 | 0.0565 | 0.0562 |
| Pin array at 1600 nm (dB) | 1.2 | 0.7 | 1.8 | 0.6 | 1.3 | 0.8 | 1.0 | 1.1 | 1.4 |
| Lateral load at 1600 nm (dB/m) | 0.16 | 0.10 | 0.26 | 0.07 | 0.17 | 0.10 | 0.08 | 0.12 | 0.09 |
| MFD at 1650 nm, micron | 10.7 | 10.7 | 11.1 | 10.3 | 10.8 | 10.5 | 10.1 | 10.6 | 10.8 |
| Aeff at 1650 nm, micron$^2$ | 89.7 | 89.7 | 95.6 | 83.0 | 87.3 | 83.8 | 82.5 | 90.3 | 92.0 |
| Dispersion at 1650 nm, ps/nm/km | 24.7 | 25.0 | 25.0 | 24.3 | 23.8 | 23.7 | 26.4 | 26.1 | 25.5 |
| Dispersion Slope at 1650 nm, ps/nm$^2$/km | 0.0534 | 0.0536 | 0.0538 | 0.0529 | 0.0554 | 0.0553 | 0.0538 | 0.0539 | 0.0535 |
| Pin array at 1650 nm (dB) | 2.1 | 1.2 | 3.0 | 1.1 | 2.2 | 1.4 | 1.9 | 1.9 | 0.8 |
| Lateral load at 1650 nm (dB/m) | 0.28 | 0.19 | 0.45 | 0.13 | 0.31 | 0.19 | 0.15 | 0.22 | 0.12 |

TABLE 1A-continued

| Parameter | Ex 1 | Ex 2 | Ex 3 | Ex 4 | Ex 5 | Ex 6 | Ex 7 | Ex 8 | Ex 9 |
|---|---|---|---|---|---|---|---|---|---|
| MFD at 1700 nm, micron | 11.0 | 10.9 | 11.3 | 10.5 | 11.0 | 10.8 | 10.3 | 10.8 | 11.0 |
| Aeff at 1700 nm, micron^2 | 93.3 | 93.0 | 99.3 | 86.3 | 91.3 | 87.6 | 85.0 | 93.2 | 95.3 |
| Dispersion at 1700 nm, ps/nm/km | 27.3 | 27.7 | 27.6 | 26.9 | 26.6 | 26.4 | 29.1 | 28.7 | 28.1 |
| Dispersion Slope at 1700 nm, ps/nm^2/km | 0.0514 | 0.0517 | 0.0519 | 0.0509 | 0.0534 | 0.0533 | 0.0517 | 0.0517 | 0.0515 |
| Pin array at 1700 nm (dB) | 3.5 | 2.0 | 4.8 | 1.9 | 3.6 | 2.4 | 3.2 | 3.1 | 1.4 |
| Lateral load at 1700 nm (dB/m) | 0.48 | 0.33 | 0.76 | 0.24 | 0.53 | 0.34 | 0.26 | 0.37 | 0.21 |
| Zero Dispersion Wavelength (nm) | 1318 | 1319 | 1322 | 1318 | 1313 | 1314 | 1292 | 1284 | 1288 |
| 1310 nm MFD (nm) | 9.26 | 9.28 | 9.57 | 8.91 | 9.11 | 8.94 | 9.44 | 9.39 | 9.44 |
| Cable Cutoff (nm) | 1415 | 1466 | 1434 | 1412 | 1416 | 1425 | 1523 | 1523 | 1475 |
| Bend loss for 10 mm mandrel diameter at 1550 nm, dB/turn | 1.75 | 1.32 | 2.13 | 1.24 | 1.50 | 1.18 | 0.45 | 0.93 | 1.53 |
| Bend loss for 15 mm mandrel diameter at 1550 nm, dB/turn | 0.31 | 0.23 | 0.38 | 0.21 | 0.26 | 0.20 | 0.079 | 0.163 | 0.27 |
| Bend loss for 20 mm mandrel diameter at 1550 nm, dB/turn | 0.054 | 0.039 | 0.069 | 0.036 | 0.045 | 0.034 | 0.014 | 0.029 | 0.048 |
| Bend loss for 30 mm mandrel diameter at 1550 nm, dB/turn | 0.0006 | 0.0004 | 0.0008 | 0.0004 | 0.0005 | 0.0003 | 0.0002 | 0.0004 | 0.0006 |
| Bend loss for 10 mm mandrel diameter at 1600 nm, dB/turn | 6.07 | 4.58 | 7.39 | 4.30 | 5.20 | 4.09 | 1.27 | 3.23 | 6.29 |
| Bend loss for 15 mm mandrel diameter at 1600 nm, dB/turn | 1.42 | 1.05 | 1.77 | 0.97 | 1.20 | 0.93 | 0.33 | 0.75 | 1.37 |
| Bend loss for 20 mm mandrel diameter at 1600 nm, dB/turn | 0.032304 | 0.0233 | 0.041 | 0.022 | 0.02692 | 0.020339 | 0.0080 | 0.017348 | 0.030 |
| Bend loss for 30 mm mandrel diameter at 1600 nm, dB/turn | 0.0005 | 0.0003 | 0.0007 | 0.0003 | 0.000417 | 0.00025 | 0.0003 | 0.000333 | 0.0001 |
| Bend loss for 10 mm mandrel | 10.25 | 7.73 | 12.47 | 7.26 | 8.78 | 6.91 | 2.23 | 5.45 | 10.33 |

TABLE 1A-continued

| Parameter | Ex 1 | Ex 2 | Ex 3 | Ex 4 | Ex 5 | Ex 6 | Ex 7 | Ex 8 | Ex 9 |
|---|---|---|---|---|---|---|---|---|---|
| diameter at 1650 nm, dB/turn | | | | | | | | | |
| Bend loss for 15 mm mandrel diameter at 1650 nm, dB/turn | 2.84 | 2.09 | 3.53 | 1.94 | 2.39 | 1.84 | 0.68 | 1.50 | 2.67 |
| Bend loss for 20 mm mandrel diameter at 1650 nm, dB/turn | 0.077 | 0.055 | 0.098 | 0.051 | 0.064 | 0.048 | 0.020 | 0.041 | 0.068 |
| Bend loss for 30 mm mandrel diameter at 1650 nm, dB/turn | 0.0007 | 0.0004 | 0.0009 | 0.0004 | 0.0005 | 0.0003 | 0.0002 | 0.0004 | 0.0007 |
| Bend loss for 10 mm mandrel diameter at 1700 nm, dB/turn | 20.7 | 15.63 | 25.22 | 14.68 | 17.76 | 13.97 | 4.56 | 11.01 | 20.69 |
| Bend loss for 15 mm mandrel diameter at 1700 nm, dB/turn | 5.40 | 3.98 | 6.71 | 3.68 | 4.54 | 3.50 | 1.32 | 2.86 | 4.95 |
| Bend loss for 20 mm mandrel diameter at 1700 nm, dB/turn | 0.174 | 0.126 | 0.223 | 0.116 | 0.145 | 0.110 | 0.048 | 0.094 | 0.145 |
| Bend loss for 30 mm mandrel diameter at 1700 nm, dB/turn | 0.0038 | 0.0025 | 0.0050 | 0.0025 | 0.0031 | 0.0019 | 0.0014 | 0.0025 | 0.0033 |

TABLE 1B

| Parameter | Ex 10 | Ex 11 | Ex 12 | Ex 13 | Ex 14 | Ex 15 | Ex 16 | Ex 17 | Ex 18 |
|---|---|---|---|---|---|---|---|---|---|
| Core Delta, $\Delta_{1max}$ % | 0.48 | 0.48 | 0.16 | 0.16 | 0 | 0.34 | 0.37 | 0.43 | 0 |
| Core radius, $r_1$, microns | 5.1 | 6.7 | 4.8 | 5.2 | 4.8 | 5.7 | 5 | 4.9 | 4.9 |
| Core Alpha | 20 | 2.5 | 200 | 100 | 100 | 20 | 20 | 20 | 100 |
| Maximum Chlorine in Core, wt % | 4.8 | 4.8 | 1.6 | 1.6 | 1.6 | 3.4 | 3.7 | 4.3 | 1.6 |
| Fluorine in Core, wt % | 0 | 0 | 0 | 0 | 0.53 | 0 | 0 | 0 | 0.53 |
| Inner Cladding Index, $\Delta_2$ % | 0 | 0 | −0.21 | −0.25 | −0.47 | −0.4 | 0 | 0 | −0.36 |
| Inner Cladding Radius, $r_2$, microns | 5.1 | 6.7 | 4.8 | 5.2 | 4.8 | 5.7 | 10.2 | 9.8 | 9.5 |

TABLE 1B-continued

| Parameter | Ex 10 | Ex 11 | Ex 12 | Ex 13 | Ex 14 | Ex 15 | Ex 16 | Ex 17 | Ex 18 |
|---|---|---|---|---|---|---|---|---|---|
| Moat Index, $\Delta_3$ % | 0 | 0 | −0.21 | −0.25 | −0.47 | −0.4 | −0.4 | −0.4 | −0.7 |
| Moat Outer Radius, $r_3$, microns | 17.7 | 15.7 | 16 | 14.6 | 21.8 | 9.3 | 14.8 | 14.3 | 14.2 |
| Outer Cladding Index, $\Delta_4$% | 0.1 | 0.04 | 0 | −0.2 | −0.37 | 0 | 0 | 0.05 | −0.36 |
| Outer Cladding Radius, $r_4$ | 62.5 | 62.5 | 62.5 | 62.5 | 62.5 | 62.5 | 62.5 | 62.5 | 62.5 |
| Moat Volume, $V_m$, (% $\Delta$ micron$^2$) | 28.73 | 8.064 | 48.92 | 9.31 | 45.2 | 21.6 | 46 | 43.38 | 37.87 |
| MFD at 1550 nm, micron | 9.7 | 10.1 | 10.4 | 10.3 | 9.6 | 9.3 | 10.2 | 9.7 | 10.3 |
| Aeff at 1550 nm, micron$^2$ | 75.7 | 79.4 | 85.0 | 85.9 | 74.4 | 73.6 | 82.5 | 75.4 | 85.1 |
| Dispersion at 1550 nm, ps/nm/km | 20.6 | 19.4 | 19.4 | 20.4 | 20.3 | 22.8 | 20.2 | 20.4 | 20.7 |
| Dispersion Slope at 1550 nm, ps/nm$^2$/km | 0.0595 | 0.0618 | 0.0583 | 0.0599 | 0.0590 | 0.0589 | 0.0628 | 0.0623 | 0.0630 |
| Pin array at 1550 nm (dB) | 0.7 | 0.2 | 1.1 | 0.8 | 1.2 | 3.7 | 0.5 | 0.003 | 0.8 |
| Lateral load at 1550 nm (dB/m) | 0.05 | 0.03 | 0.13 | 0.09 | 0.07 | 0.17 | 0.05 | 0.0004 | 0.07 |
| MFD at 1600 nm. Micron | 9.8 | 10.3 | 10.6 | 10.5 | 9.8 | 9.4 | 10.4 | 9.9 | 10.5 |
| Aeff at 1600 nm, micron$^2$ | 78.0 | 82.5 | 88.3 | 88.6 | 76.7 | 75.1 | 85.3 | 77.8 | 87.8 |
| Dispersion at 1600 nm, ps/nm/km | 23.4 | 22.4 | 22.3 | 23.3 | 23.1 | 25.6 | 23.2 | 23.4 | 23.8 |
| Dispersion Slope at 1600 nm, ps/nm$^2$/km | 0.0562 | 0.0585 | 0.0552 | 0.0566 | 0.0558 | 0.0550 | 0.0600 | 0.0593 | 0.0600 |
| Pin array at 1600 nm (dB) | 1.4 | 0.5 | 1.9 | 1.5 | 2.2 | 6.6 | 1.1 | 0.001 | 1.4 |
| Lateral load at 1600 nm (dB/m) | 0.09 | 0.07 | 0.23 | 0.16 | 0.12 | 0.29 | 0.10 | 0.0002 | 0.13 |
| MFD at 1650 nm, micron | 10.0 | 10.6 | 10.8 | 10.7 | 10.0 | 9.5 | 10.6 | 10.0 | 10.7 |
| Aeff at 1650 nm, micron$^2$ | 80.4 | 85.7 | 91.7 | 91.4 | 79.2 | 76.8 | 88.2 | 80.2 | 90.5 |
| Dispersion at 1650 nm, ps/nm/km | 26.2 | 25.3 | 25.0 | 26.1 | 25.9 | 28.3 | 26.2 | 26.3 | 26.8 |
| Dispersion Slope at 1650 nm, ps/nm$^2$/km | 0.0535 | 0.0558 | 0.0528 | 0.0540 | 0.0532 | 0.0516 | 0.0576 | 0.0570 | 0.0576 |

TABLE 1B-continued

| Parameter | Ex 10 | Ex 11 | Ex 12 | Ex 13 | Ex 14 | Ex 15 | Ex 16 | Ex 17 | Ex 18 |
|---|---|---|---|---|---|---|---|---|---|
| Pin array at 1650 nm (dB) | 2.5 | 1.0 | 3.1 | 2.6 | 3.8 | 11.1 | 1.9 | 0.2 | 2.4 |
| Lateral load at 1650 nm (dB/m) | 0.17 | 0.13 | 0.39 | 0.28 | 0.22 | 0.47 | 0.19 | 0.03 | 0.23 |
| MFD at 1700 nm, micron | 10.2 | 10.8 | 11.1 | 10.9 | 10.1 | 9.7 | 10.8 | 10.2 | 10.9 |
| Aeff at 1700 nm, micron$^2$ | 82.9 | 89.0 | 95.4 | 94.3 | 81.7 | 78.6 | 91.1 | 82.8 | 93.3 |
| Dispersion at 1700 nm, ps/nm/km | 28.8 | 28.0 | 27.6 | 28.7 | 28.5 | 30.8 | 29.0 | 29.1 | 29.6 |
| Dispersion Slope at 1700 nm, ps/nm$^2$/km | 0.0515 | 0.0537 | 0.0510 | 0.0519 | 0.0512 | 0.0487 | 0.0559 | 0.0552 | 0.0558 |
| Pin array at 1700 nm (dB) | 4.3 | 1.7 | 5.0 | 4.2 | 6.3 | 17.9 | 3.2 | 0.5 | 4.0 |
| Lateral load at 1700 nm (dB/m) | 0.28 | 0.26 | 0.66 | 0.46 | 0.36 | 0.76 | 0.31 | 0.06 | 0.38 |
| Zero Dispersion Wavelength (nm) | 1283 | 1301 | 1318 | 1284 | 1328 | 1258 | 1292 | 1288 | 1287 |
| 1310 nm MFD (nm) | 8.87 | 9.17 | 9.32 | 9.43 | 8.78 | 8.7 | 9.28 | 8.87 | 9.43 |
| Cable Cutoff (nm) | 1520 | 1526 | 1399 | 1519 | 1523 | 1524 | 1522 | 1525 | 1524 |
| Bend loss for 10 mm mandrel diameter at 1550 nm, dB/turn | 0.19 | 0.58 | 2.04 | 0.88 | 0.07 | 0.50 | 0.07 | 0.04 | 0.13 |
| Bend loss for 15 mm mandrel diameter at 1550 nm, dB/turn | 0.034 | 0.097 | 0.36 | 0.156 | 0.014 | 0.094 | 0.013 | 0.008 | 0.025 |
| Bend loss for 20 mm mandrel diameter at 1550 nm, dB/turn | 0.006 | 0.016 | 0.066 | 0.028 | 0.0026 | 0.018 | 0.0025 | 0.0015 | 0.005 |
| Bend loss for 30 mm mandrel diameter at 1550 nm, dB/turn | 0.0002 | 0.0002 | 0.0007 | 0.0004 | 0.0001 | 0.0005 | 0.0001 | 0.0001 | 0.0002 |
| Bend loss for 10 mm mandrel diameter at 1600 nm, dB/turn | 0.67 | 2.00 | 7.08 | 3.05 | 0.25 | 1.73 | 0.24 | 0.14 | 0.45 |

TABLE 1B-continued

| Parameter | Ex 10 | Ex 11 | Ex 12 | Ex 13 | Ex 14 | Ex 15 | Ex 16 | Ex 17 | Ex 18 |
|---|---|---|---|---|---|---|---|---|---|
| Bend loss for 15 mm mandrel diameter at 1600 nm, dB/turn | 0.16 | 0.45 | 1.67 | 0.72 | 0.06 | 0.43 | 0.060 | 0.037 | 0.12 |
| Bend loss for 20 mm mandrel diameter at 1600 nm, dB/turn | 0.003589 | 0.009571 | 0.039482 | 0.01675 | 0.001555 | 0.010768 | 0.001496 | 0.000897 | 0.002991 |
| Bend loss for 30 mm mandrel diameter at 1600 nm, dB/turn | 0.000167 | 0.000167 | 0.000583 | 0.000333 | 0.0001 | 0.0004 | 0.0001 | 0.0001 | 0.000167 |
| Bend loss for 10 mm mandrel diameter at 1650 nm, dB/turn | 1.13 | 3.38 | 11.95 | 5.15 | 0.43 | 2.93 | 0.41 | 0.24 | 0.76 |
| Bend loss for 15 mm mandrel diameter at 1650 nm, dB/turn | 0.31 | 0.89 | 3.32 | 1.44 | 0.13 | 0.87 | 0.12 | 0.07 | 0.23 |
| Bend loss for 20 mm mandrel diameter at 1650 nm, dB/turn | 0.009 | 0.023 | 0.094 | 0.040 | 0.004 | 0.026 | 0.004 | 0.002 | 0.007 |
| Bend loss for 30 mm mandrel diameter at 1650 nm, dB/turn | 0.0002 | 0.0002 | 0.0008 | 0.0004 | 0.0001 | 0.0005 | 0.0001 | 0.0001 | 0.0002 |
| Bend loss for 10 mm mandrel diameter at 1700 nm, dB/turn | 2.29 | 6.83 | 24.15 | 10.41 | 0.86 | 5.92 | 0.83 | 0.49 | 1.54 |
| Bend loss for 15 mm mandrel diameter at 1700 nm, dB/turn | 0.60 | 1.70 | 6.31 | 2.73 | 0.25 | 1.65 | 0.23 | 0.14 | 0.44 |
| Bend loss for 20 mm mandrel diameter at 1700 | 0.019 | 0.052 | 0.213 | 0.090 | 0.008 | 0.058 | 0.008 | 0.005 | 0.016 |

TABLE 1B-continued

| Parameter | Ex 10 | Ex 11 | Ex 12 | Ex 13 | Ex 14 | Ex 15 | Ex 16 | Ex 17 | Ex 18 |
|---|---|---|---|---|---|---|---|---|---|
| nm, dB/turn | | | | | | | | | |
| Bend loss for 30 mm mandrel diameter at 1700 nm, dB/turn | 0.0013 | 0.0013 | 0.0044 | 0.0025 | 0.0006 | 0.0031 | 0.0006 | 0.0006 | 0.0013 |

Parameter X calculated for the fiber examples 1-18 of Tables 1A and 1B and is provided in Table 2, below

TABLE 2

| Fiber embodiment | X |
|---|---|
| Ex 1 | 1.565 |
| Ex 2 | 1.617 |
| Ex 3 | 1.584 |
| Ex 4 | 1.561 |
| Ex 5 | 1.527 |
| Ex 6 | 1.537 |
| Ex 7 | 1.7 |
| Ex 8 | 1.686 |
| Ex 9 | 1.632 |
| Ex 10 | 1.677 |
| Ex 11 | 1.703 |
| Ex 12 | 1.426 |
| Ex 13 | 1.689 |
| Ex 14 | 1.683 |
| Ex 15 | 1.747 |
| Ex 16 | 1.673 |
| Ex 17 | 1.670 |
| Ex 18 | 1.673 |

The exemplary fiber embodiments depicted in Tables 1A and 1B have excellent optical performances and an unusually low bend loss. The relative refractive index profiles shown in FIGS. 1-4, and disclosed in Tables 1A, 1B are provided relative to pure silica. The optical properties of the single-moded (SM) optical fibers in Tables 1A and 1B exhibit excellent bend performance. The optical properties of the single mode fibers described herein demonstrate low attenuation, and an excellent bend performance.

The alpha profile in the graded index core can be achieved using various methods such as soot to glass outside vapor deposition (OVD) and vapor-phase axial deposition (VAD) methods. A second approach relies on a modified chemical vapor deposition (MCVD) approach. A third approach relies on a plasma-assisted chemical vapor deposition (PCVD) approach. In MCVD and PCVD approaches, the optical fiber core is made by layer-by-layer glass deposition, and the processes used to dope each layer can be independently controlled.

According to some embodiments, in an OVD or VAD soot to glass process, the graded index refractive index profile is achieved by doping the core with either germania or chlorine precursor (e.g., $SOCl_2$, $SiCl_4$) during the preform consolidation and/or doping step of the optical fiber preform manufacturing. A silica soot core preform is made, for example, using the OVD or VAD silica soot deposition process. However, the soot preform for making optical fiber can be manufactured also by other methods.

In certain aspects of the methods for making the optical fibers disclosed herein, high soot surface area preforms (i.e., as compared to preform surface areas used in conventional optical fiber processing) can be employed for doping the core. In some embodiments, the surface area of the soot preform is larger than 10 $m^2$/gm, larger than 20 $m^2$/gm, larger than 25 $m^2$/gm, or even larger than 50 $m^2$/gm. In certain other embodiments, the surface area of the soot preform can be larger than 90 $m^2$/gm. In the embodiments described herein the soot is silica soot. The surface area of the soot preform can be measured using Brunauer-Emmett-Teller (BET) surface area characterization techniques, as understood within the operative field of the disclosure. According to one embodiment the soot preform has a density of about 0.5 $g/cm^3$ (e.g. 0.4-0.6 $g/cm^3$) and it is prepared in a lathe by flame depositing silica soot onto a 10 mm diameter removable alumina rotating bait rod comprising a silica handle.

In the first step of making of an optical preform, a silica soot preform is treated with a dehydration agent (for example, chlorine, $SOCl_2$, $SiCl_4$, or CO) to remove the water and metal impurities. The dehydration step is performed by exposing the preform to a temperature of between 900° C. and 1300° C.

According to some embodiments a method for making an optical fiber comprises the steps of:
  (i) depositing the silica core in laydown step to make the soot core preform;
  (ii) consolidating the soot core preform and doping with chlorine precursor during consolidation to make a consolidated seed free glass chlorine doped core preform (also referred to herein as the consolidated glass core preform);
  (iii) depositing silica soot layer on the glass core preform and consolidating the silica soot layer optionally in the presence of fluorine precursor to form the preform having the core and an inner cladding region;
  (iv) depositing a silica soot layer to form a trench region on the glass preform having the core and inner cladding region and consolidating in presence of fluorine precursor to form fluorine doped moat region of a preform having a core, an inner cladding and a moat region;
  (v) overcladding the consolidated glass preform having a core, an inner cladding and a moat region with silica soot to form the overclad soot layer of the optical fiber preform;
  (vi) optionally doping the overclad soot layer with chlorine or fluorine by exposing the soot layer to chlorine or fluorine dopant precursor (to increase or decrease its refractive index, as needed) to a temperature between 1000° C. and 1400° C.;
  (vii) consolidating or sintering the outer cladding soot layer at temperatures between 1300° C. and 1500° C. for at least 30 minutes to form the seed free glass overclad layer (which will correspond to the outer cladding layer in the drawn fiber) and the consolidated optical fiber glass preform;

(viii) drawing the optical fiber from the consolidated optical fiber glass.

In some embodiments, the silica core preform is doped with chlorine during the core consolidation step to form a chlorine doped consolidated glass core preform. In some other embodiments, the silica soot of the inner cladding region is doped with fluorine to form a depressed index inner cladding region. In still other embodiments, the core and the inner cladding regions are deposited in a single step and the consolidation of the core and the inner cladding region is performed in a single step.

The optical fibers described herein, including fibers 100, may be fabricated with drawing processes having a draw tension of about less than 90 g. Preferably, the draw tension is set at less than about 45 g, and more preferably, set between about 30 g and about 45 g. Fibers that are formed with these processing parameters are even less susceptible to draw-induced stresses that can be detrimental to the optical transmission properties of the fiber, including waveguide propagation performance.

The fibers disclosed herein, including fibers 100, may be drawn from optical fiber preforms made using conventional manufacturing techniques and using known fiber draw methods and apparatus, for example as are disclosed in U.S. Pat. Nos. 7,565,820, 5,410,567, 7,832,675, and 6,027,062, the specifications of which are hereby incorporated by reference. In particular, optical fibers 100 can be pulled from a root portion of the optical fiber preform by a tractor within a draw furnace. After leaving the draw furnace, the bare optical fiber encounters a diameter monitor (D) which provides a signal that is used in a feedback control loop to regulate the speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in European Patent No. EP 0479120 A2, which is incorporated herein by reference. The optical fibers disclosed herein, including fibers 100 can be drawn from such preforms and coated with standard primary and secondary urethane acrylate coatings.

According to certain aspects of the disclosure, the maximum concentration of Cl within the core is greater than 0.5 wt %. In other embodiments, the maximum chlorine weight % in the core is greater than 1 wt %. In still other embodiments, the maximum chlorine weight % in the core is greater than 2 wt %. In some embodiments, the maximum germania weight % in the core is greater than 4 wt % and less than 6 wt %. According to some embodiments the concentration of Cl in the outer cladding region of the cladding is greater than 0.2 wt %. In other embodiments, the chlorine concentration in the outer cladding is greater than 0.4 wt %. In still other embodiments, the chlorine concentration in the outer cladding region of the cladding is greater than 1.2 wt %. In yet other embodiments, the chlorine concentration in the outer cladding region is greater than 1.5 wt %. In some embodiments, the chlorine concentration in the outer cladding region is greater than 0.2 wt % and less than 2.5 wt %. In some other embodiments, the outer cladding is pure silica. In some other embodiments, the outer cladding is doped with fluorine. In still other embodiments, the outer cladding is doped with updopants such as germania, titania or alumina.

In some embodiments, the inner cladding is pure silica. In still other embodiments, the inner cladding is doped with fluorine. The concentration of fluorine in the inner cladding in these embodiments is between 0.1 wt % and 1.5 wt %. In yet other embodiments, the first cladding region (inner cladding) is co-doped with fluorine and chlorine.

The moat region has a minimum relative refractive index $\Delta_{3min}$ % that is lower than that of the regions that are in contact with the moat. For example minimum relative refractive index $\Delta_{3min}$ % is smaller than that of $\Delta_{1max}$ % and that of $\Delta_4$ %. Similarly, in the embodiments that utilize a first cladding with a refractive index $\Delta_2$, the refractive index of the moat is less than the refractive index of the first cladding region and outer cladding region, i.e. $\Delta_3$ %<$\Delta_2$ % The composition of the cladding can also be important in achieving the desired low bending loss properties and, as described above, the moat region may be doped with fluorine (and/or boron) to lower the refractive index to be lower than the refractive index of the core. In certain aspects of the optical fibers, the low relative refractive index of a moat region can be at least 0.025% less than the maximum relative refractive index of the outer cladding region. Similarly, in some embodiments, the relative refractive index difference between the moat region and the outer cladding region can be between 0.02% and 0.25%, for example between 0.04% and 0.2%. In some embodiments, the relative refractive index difference of the moat and the outer cladding (44%-43%) can be between 0.05% and 0.2%, for example between 0.12% and 0.2%.

Clause 1 of the present disclosure extends to:

A single mode optical fiber, comprising:

(i) a silica based core comprising a refractive index profile with an alpha (a) between 1.8 and 200, a relative refractive index $\Delta_{1max}$ % with respect to silica, and an outer radius $r_1$, wherein 7 microns>$r_1 \geq$ 4.5 microns, the core further comprising silica doped with chlorine, wherein the maximum chlorine concentration in the core is greater than 0.5 wt %; and (ii) a cladding comprising an outer cladding region surrounding the core, the outer cladding region having a relative refractive index $\Delta_4$ with respect to silica, and Wherein:

the core is structured such that 1.40<X<1.71 where $X=[(2\pi n_1(2\Delta_{cmax}r_1^2)^{1/2}/V_c)+(0.0028 V_m)]$, $n_1$ is maximum refractive index of the core, $\Delta_{cmax}=(\Delta_{1max}\% - \Delta_4\%)/100\%$, $V_m$ is moat volume, and $V_c$ is a function of core alpha (α) such that $V_c = -0.0383\alpha^3 + 0.4624\alpha^2 - 1.924\alpha + 5.9152$, for $1 \leq \alpha < 5$;
$V_c = 2.123 - 0.0474\alpha$, for $5 \leq \alpha < 10$,
$V_c = 2.771 - 0.0122\alpha$, for $10 \leq \alpha < 20$,
$V_c = 2.5575 - 0.0015\alpha$, for $20 \leq \alpha < 100$,
$V_c = 2.5575 - 0.0005\alpha$, for $100 \leq \alpha$;

and said fiber having MFD at 1550 nm wavelength of 10 to 12 microns, a zero dispersion wavelength of less than 1400 nm, a 22 m cable cutoff wavelength of greater than 1275 nm and less than 1530 nm; and a bend loss of:

(a) less than 0.001 dB/turn at 1550 nm wavelength when the optical fiber is bent around a 30 mm diameter mandrel; and (b) less than 0.1 dB/turn at 1550 nm wavelength when the fiber is bent around a 20 mm diameter mandrel.

Clause 2 of the present disclosure extends to: The fiber of clause 1, wherein $1.41<X<1.7$.

Clause 3 of the present disclosure extends to: The fiber of clause 1, wherein $1.45<X<1.7$.

Clause 4 of the present disclosure extends to: The fiber of clause 1, wherein the maximum chlorine concentration in the core is greater than 1 wt %.

Clause 5 of the present disclosure extends to: The fiber of clause 1, wherein the maximum chlorine concentration in the core is greater than 1.5 wt %

Clause 6 of the present disclosure extends to: The fiber of clause 1, wherein the maximum chlorine concentration in the core is greater than 2 wt %.

Clause 7 of the present disclosure extends to: The fiber of clause 1, wherein the maximum chlorine concentration in the core is greater than 3 wt %.

Clause 8 of the present disclosure extends to: The fiber of any of clauses 1-7, wherein $0\%\leq\Delta_{1max}\%\leq0.5\%$.

Clause 9 of the present disclosure extends to: The fiber of any of clauses 1-8, wherein $0\%\leq\Delta_{1max}\%\leq0.48\%$.

Clause 10 of the present disclosure extends to: The fiber of any of clauses 1-9, further comprising a moat surrounding said core having relative refractive index $\Delta_{3min}$ %.

Clause 11 of the present disclosure extends to: The fiber of any of clauses 1-9, wherein the cladding comprises a first cladding region, the outer cladding region surrounds the first cladding region, said first cladding region being in contact with and surrounding the core, the first cladding region having a relative refractive index $\Delta_2$ %, an inner radius $r_1$, and an outer radius $r_2$, wherein $r_2<20$ microns, $\Delta_2\%<\Delta_{1max}$ %; said cladding further comprising a moat surrounding said core, said moat having a relative refractive index $\Delta_{3min}$ %, an inner radius $r_2$, and an outer radius $r_3$, wherein $r_3<25$ microns.

Clause 12 of the present disclosure extends to: The fiber of any of clauses 1-11, wherein the zero dispersion wavelength is less than 1330 nm.

Clause 13 of the present disclosure extends to: The fiber according to any of clause 1-12, wherein the bend loss is less than 0.001 dB/turn at the 1550 nm wavelength, when the optical fiber is bent around 20 mm diameter mandrel.

Clause 14 of the present disclosure extends to: The fiber according to any of clause 1-13, wherein the bend loss is less than 0.0005 dB/turn mandrel at the 1550 nm wavelength, when the optical fiber is bent around 30 mm diameter.

Clause 15 of the present disclosure extends to: The fiber according to any of clause 1-14, wherein the bend loss is less than 0.2 dB/turn at the 1700 nm wavelength, when the optical fiber is bent around 20 mm diameter mandrel.

Clause 16 of the present disclosure extends to: The fiber according to any of clause 1-15, wherein the bend loss is less than 0.1 dB/turn at the 1700 nm wavelength, when the optical fiber is bent around 30 mm diameter mandrel.

Clause 17 of the present disclosure extends to: The fiber according to any of clauses 1-16, wherein 10.7 microns>MFD (at 1550 nm)>9.2 microns.

Clause 18 of the present disclosure extends to: The fiber according to clauses 1-16, wherein 10.6 microns>MFD (at 1550 nm)>9.7 microns.

Clause 19 of the present disclosure extends to: The fiber according to any of clauses 1-18, wherein 6.8 microns>$r_1\geq$4.7 microns.

Clause 20 of the present disclosure extends to: The fiber according to any of clauses 1-18, wherein 6.7 microns>$r_1\geq$4.8 microns.

Clause 21 of the present disclosure extends to: The fiber according to any of clauses 1-9, wherein the fiber cladding includes a moat with a relative refractive index $\Delta_{3min}$ %, and $0.1\%\geq\Delta_4\%-\Delta_{3min}\%\geq0.45\%$.

Clause 22 of the present disclosure extends to: The fiber according to any of clauses 1-9, wherein the fiber cladding includes a first cladding region with a relative refractive index $\Delta_2$ %, and the outer cladding region surrounding and in direct contact with the first cladding region and, $\Delta_{1max}\%-\Delta_2\%$ is greater than 0.3%, and $0\%\leq\Delta_{1max}\%\leq0.5\%$.

Clause 23 of the present disclosure extends to: The fiber according to clause 22, wherein $\Delta_{1max}\%-\Delta_2\%$ is greater than 0.35%.

Clause 24 of the present disclosure extends to: The fiber according to any of clauses 1-9, wherein the fiber cladding includes a first cladding region with a relative refractive index $\Delta_2$ %, and a moat with a relative refractive index $\Delta_{3min}$ surrounding the first cladding region, wherein the outer cladding region surrounds the moat, and $0.1\%\leq(\Delta_4\%-\Delta_{3min}\%)\leq0.45\%$ and $0.3\%\leq(\Delta_2\%-\Delta_{3min}\%)\leq0.45\%$.

Clause 25 of the present disclosure extends to: The fiber according to clause 24 wherein the moat comprises moat volume $V_m$, and $0\%\Delta$ micron$^2<V_m<70\%\Delta$ micron$^2$.

Clause 26 of the present disclosure extends to: The fiber according to clause 25 wherein the moat comprises moat volume $V_m$, and $5\%\Delta$ micron$^2<V_m<60\%\Delta$ micron$^2$.

Clause 27 of the present disclosure extends to: The fiber according to any of clauses 1-26, wherein the core has less than 0.1 wt % germania ($GeO_2$).

Clause 28 of the present disclosure extends to: The fiber according to any of clauses 1-28, wherein the core is germania free.

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. A single mode optical fiber, comprising:
   (i) a silica based core comprising a refractive index profile with an alpha ($\alpha$) between 1.8 and 200, a relative refractive index $\Delta_{1max}$ % with respect to silica, and an outer radius $r_1$, wherein 7 microns>$r_1\geq$4.5 microns, the core further comprising silica doped with chlorine, wherein the maximum chlorine concentration in the core is greater than 0.5 wt %; and
   (ii) a cladding comprising an outer cladding region surrounding the core, the outer cladding region having a relative refractive index $\Delta_4$ with respect to silica, and wherein:

the core is structured such that $1.40<X<1.71$ where $X=[(2\pi n_1(2\Delta_{cmax}r_1^2)^{1/2}/V_c)+(0.0028V_m)]$, $n_1$ is maximum refractive index of the core, $\Delta_{cmax}=(\Delta_{1max}\%-\Delta_4\%)/100\%$, $V_m$ is moat volume, and $V_c$ is a function of core alpha ($\alpha$) such that $V_c = -0.0383\alpha^3 + 0.4624\alpha^2 - 1.924\alpha + 5.9152$, for $1 \leq \alpha < 5$;
$V_c = 2.123 - 0.0474\alpha$, for $5 \leq \alpha < 10$,
$V_c = 2.771 - 0.0122\alpha$, for $10 \leq \alpha < 20$,
$V_c = 2.5575 - 0.0015\alpha$, for $20 \leq \alpha < 100$,
$V_c = 2.5575 - 0.0005\alpha$, for $100 \leq \alpha$;

and
said fiber having MFD at 1550 nm wavelength of 10 to 12 microns, a zero dispersion wavelength of less than 1400 nm, a 22 m cable cutoff wavelength of greater than 1275 nm and less than 1530 nm; and
a bend loss of:
(a) less than 0.001 dB/turn at 1550 nm wavelength when the optical fiber is bent around a 30 mm diameter mandrel; and
(b) less than 0.1 dB/turn at 1550 nm wavelength when the fiber is bent around a 20 mm diameter mandrel.

2. The fiber of claim 1, wherein 1.41<X<1.7.

3. The fiber of claim 1, wherein 1.45<X<1.7.

4. The fiber of claim 1, wherein the maximum chlorine concentration in the core is greater than 1 wt %.

5. The fiber of claim 1, wherein the maximum chlorine concentration in the core is greater than 1.5 wt %.

6. The fiber of claim 1, wherein the maximum chlorine concentration in the core is greater than 2 wt %.

7. The fiber of claim 1, wherein the maximum chlorine concentration in the core is greater than 3 wt %.

8. The fiber of claim 1, wherein $0\% < \Delta_{1max}\% \leq 0.5\%$.

9. The fiber of claim 1, wherein $0\% < \Delta_{1max}\% \leq 0.48\%$.

10. The fiber of claim 1, further comprising a moat surrounding said core having relative refractive index $\Delta_{3min}\%$.

11. The fiber of claim 1, wherein the cladding comprises a first cladding region, the outer cladding region surrounds the first cladding region, said first cladding region being in contact with and surrounding the core, the first cladding region having a relative refractive index $\Delta_2\%$, an inner radius $r_1$, and an outer radius $r_2$, wherein $r_2 < 20$ microns, $\Delta_2\% < \Delta_{1max}\%$; said cladding further comprising a moat surrounding said core, said moat having a relative refractive index $\Delta_{3min}\%$, an inner radius $r_2$, and an outer radius $r_3$, wherein $r_3 < 25$ microns.

12. The fiber of claim 1, wherein the zero dispersion wavelength is less than 1330 nm.

13. The fiber of claim 1, wherein the bend loss is less than 0.001 dB/turn at the 1550 nm wavelength, when the optical fiber is bent around 20 mm diameter mandrel.

14. The fiber of claim 1, wherein the bend loss is less than 0.0005 dB/turn mandrel at the 1550 nm wavelength, when the optical fiber is bent around 30 mm diameter.

15. The fiber of claim 1, wherein the bend loss is less than 0.2 dB/turn at 1700 nm wavelength, when the optical fiber is bent around 20 mm diameter mandrel.

16. The fiber of claim 1, wherein the bend loss is less than 0.1 dB/turn at the 1700 nm wavelength, when the optical fiber is bent around 30 mm diameter mandrel.

17. The fiber of claim 1, wherein 10.7 microns>MFD (at 1550 nm)>9.2 microns.

18. The fiber of claim 17, wherein 10.6 microns>MFD (at 1550 nm)>9.7 microns.

19. The fiber of claim 1, wherein 6.8 microns>$r_1$≥4.7 microns.

20. The fiber of claim 19, wherein 6.7 microns>$r_1$≥4.8 microns.

21. The fiber of the claim 1, wherein the fiber cladding includes a moat with a relative refractive index 43 min %, and $0.1\% \geq \Delta_4\% - \Delta_{3min}\% \geq 0.45\%$.

22. The fiber of claim 1, wherein the fiber cladding includes a first cladding region with a relative refractive index 42%, and the outer cladding region surrounding and in direct contact with the first cladding region and, $\Delta_{1max}\% - \Delta_2\%$ is greater than 0.3%, and $0\% \leq \Delta_{1max}\% \leq 0.5\%$.

23. The fiber of claim 22, wherein $\Delta_{1max}\% - \Delta_2\%$ is greater than 0.35%.

24. The fiber of claim 1, wherein the fiber cladding includes a first cladding region with a relative refractive index 42%, and a moat with a relative refractive index 43 min surrounding the first cladding region, wherein the outer cladding region surrounds the moat, and $0.1\% \leq (\Delta_4\% - \Delta_{3min}\%) \leq 0.45\%$ and $0.3\% \leq (\Delta_2\% - \Delta_{3min}\%) \leq 0.45\%$.

25. The fiber of claim 24, wherein the moat comprises moat volume $V_m$, and 0% $\Delta$ micron²<$V_m$<70% $\Delta$ micron².

26. The fiber of claim 25, wherein the moat comprises moat volume $V_m$, and 5% $\Delta$micron²<$V_m$<60% $\Delta$ micron².

27. The fiber of claim 1, wherein the core has less than 0.1 wt % germania ($GeO_2$).

28. The fiber of claim 1, wherein the core is germania free.

* * * * *

UNITED STATES PATENT AND TRADEMARK OFFICE
CERTIFICATE OF CORRECTION

PATENT NO. : 10,775,558 B2
APPLICATION NO. : 16/260515
DATED : September 15, 2020
INVENTOR(S) : Dana Craig Bookbinder et al.

It is certified that error appears in the above-identified patent and that said Letters Patent is hereby corrected as shown below:

In the Claims

Column 33, Line 28, Claim 8, delete "0%<$\Delta_{1max}$" and insert -- 0%≤ $\Delta_{1max}$ --, therefor.

Column 33, Line 29, Claim 9, delete "0%<$\Delta_{1max}$" and insert -- 0%≤ $\Delta_{1max}$ --, therefor.

Column 34, Line 22, Claim 21, delete "43 min" and insert -- $\Delta_{3min}$ --, therefor.

Column 34, Line 26, Claim 22, delete "42%" and insert -- $\Delta_2$% --, therefor.

Column 34, Line 33, Claim 24, delete "42%" and insert -- $\Delta_2$% --, therefor.

Column 34, Lines 33-34, Claim 24, delete "43 min" and insert -- $\Delta_{3min}$ --, therefor.

Signed and Sealed this
Twentieth Day of December, 2022

Katherine Kelly Vidal
*Director of the United States Patent and Trademark Office*